United States Patent
Miyakoshi

(10) Patent No.: US 9,172,862 B2
(45) Date of Patent: Oct. 27, 2015

(54) INFORMATION PROCESSING DEVICE, INFORMATION PROCESSING METHOD, AND PROGRAM

(71) Applicant: Sony Corporation, Tokyo (JP)

(72) Inventor: Daisuke Miyakoshi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 263 days.

(21) Appl. No.: 13/658,158

(22) Filed: Oct. 23, 2012

(65) Prior Publication Data
US 2013/0107067 A1    May 2, 2013

(30) Foreign Application Priority Data

Oct. 31, 2011 (JP) ................................ 2011-239041

(51) Int. Cl.
*H04N 5/232* (2006.01)
*H04N 5/345* (2011.01)
*H04N 5/369* (2011.01)

(52) U.S. Cl.
CPC ........... *H04N 5/23212* (2013.01); *H04N 5/345* (2013.01); *H04N 5/3696* (2013.01)

(58) Field of Classification Search
CPC . H04N 5/23212; H04N 5/345; H04N 5/3452; H04N 5/3454; H04N 5/3456
USPC ......................................... 348/345, 349–356
See application file for complete search history.

(56) References Cited

U.S. PATENT DOCUMENTS

| 2008/0259202 | A1  | 10/2008 | Fujii |  |
|---|---|---|---|---|
| 2008/0273099 | A1* | 11/2008 | Ono | 348/241 |
| 2010/0045798 | A1* | 2/2010 | Sugimoto et al. | 348/157 |
| 2011/0267511 | A1* | 11/2011 | Imafuji | 348/294 |
| 2011/0285899 | A1* | 11/2011 | Hirose | 348/360 |
| 2011/0310291 | A1* | 12/2011 | Kato et al. | 348/354 |
| 2013/0010179 | A1* | 1/2013 | Takahara et al. | 348/353 |
| 2014/0184866 | A1* | 7/2014 | Ogushi et al. | 348/308 |

FOREIGN PATENT DOCUMENTS

JP      2008-134389 A      6/2008

* cited by examiner

*Primary Examiner* — Timothy J Henn
(74) *Attorney, Agent, or Firm* — Hazuki International, LLC

(57) ABSTRACT

An information processing device includes a detecting unit configured to detect a motion of a subject included in an image generated by an imaging device including multiple phase difference detecting pixels which generate a signal arranged to perform focus determination by phase difference detection, and multiple image generating pixels which generate a signal arranged to generate an image; and a determining unit configured to determine thinning-out processing when reading out a signal from the imaging device, according to the detected motion of a subject.

12 Claims, 12 Drawing Sheets

FIG. 4
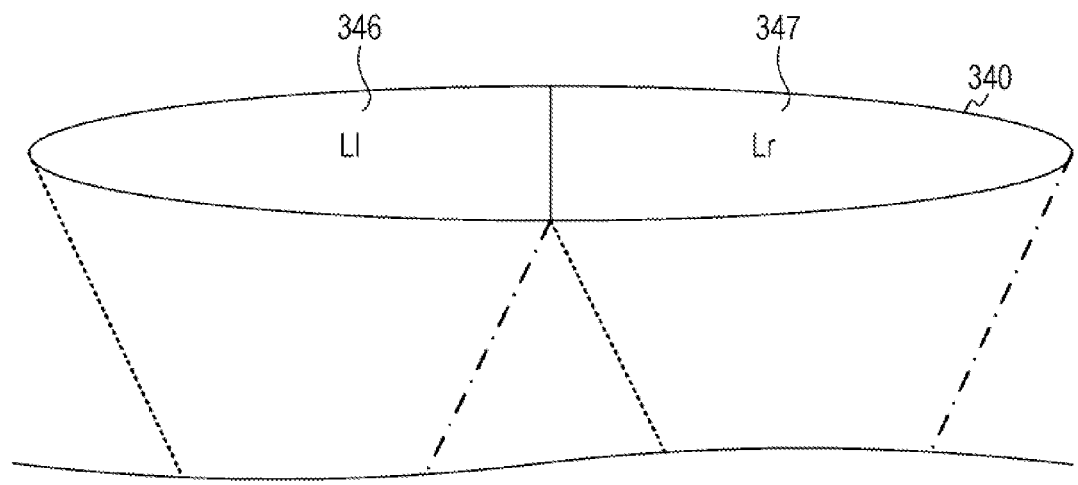
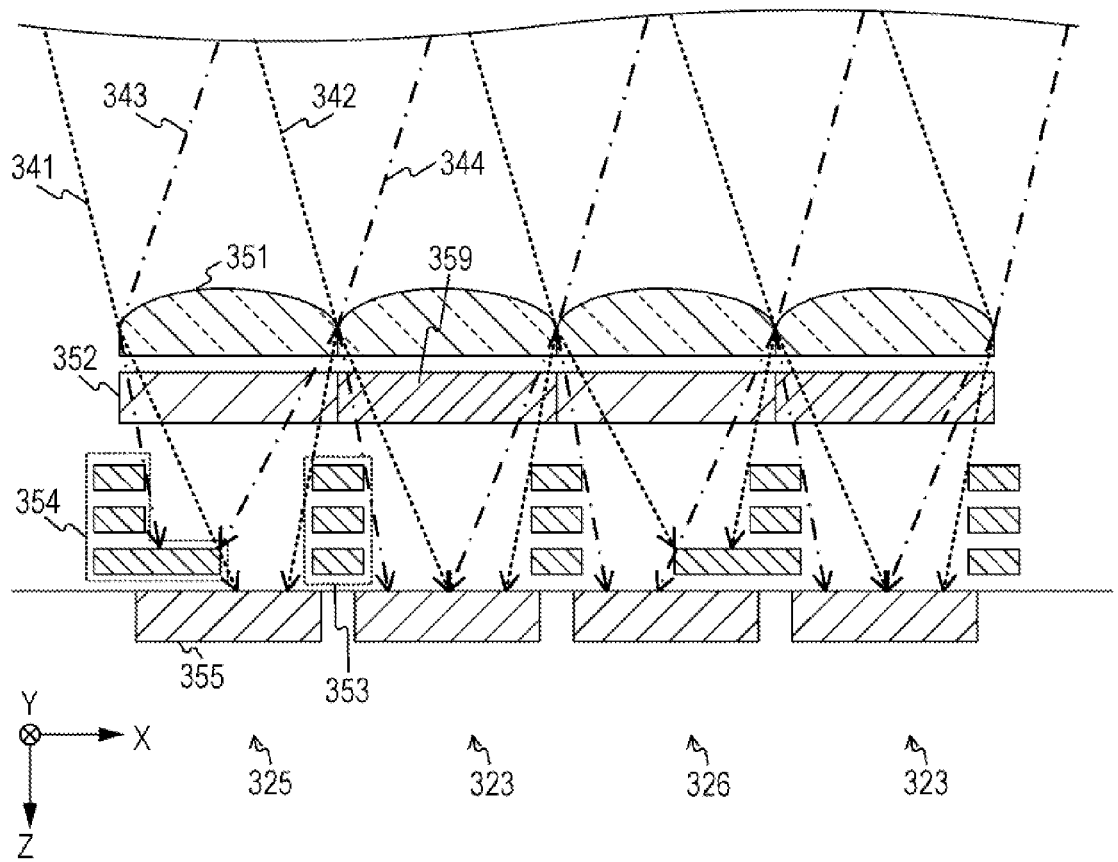

FIG. 10A

| READOUT MODE | PHASE DIFFERENCE DETECTION | | CONTRAST DETECTION | | READOUT SPEED | IMAGE QUALITY | IMAGED IMAGE USE |
|---|---|---|---|---|---|---|---|
| | AVAILABLE/ UNAVAILABLE | EXECUTE/ NOT EXECUTE | AVAILABLE/ UNAVAILABLE | EXECUTE/ NOT EXECUTE | | | |
| ALL-PIXEL READOUT MODE | AVAILABLE | EXECUTE | AVAILABLE | NOT EXECUTE | ×1 | BEST | IMAGING OF STILL IMAGE |
| CONTRAST THINNING-OUT MODE | UNAVAILABLE | NOT EXECUTE | AVAILABLE | EXECUTE | ×3 | SLIGHTLY WORSE | HIGH-QUALITY LIVE VIEW |
| PHASE DIFFERENCE THINNING-OUT MODE | AVAILABLE | EXECUTE | AVAILABLE | EXECUTE ACCORDING TO SUBJECT | ×3 | WORST | LOW-QUALITY LIVE VIEW |
| MOVING IMAGE THINNING-OUT MODE | UNAVAILABLE | NOT EXECUTE | AVAILABLE | EXECUTE | ×3 | SLIGHTLY BETTER | IMAGING OF MOVING IMAGE |

FIG. 10B

| SUBJECT | READOUT MODE | FOCUSING DETERMINATION | SPEED OF FOCUSING |
|---|---|---|---|
| NO MOTION OR SMALL MOTION | CONTRAST THINNING-OUT MODE | ONLY DETECTION OF CONTRAST | SLOW |
| GREAT MOTION | PHASE DIFFERENCE THINNING-OUT MODE | PREFERENTIALLY EXECUTE DETECTION OF PHASE DIFFERENCE | FAST |

INFORMATION PROCESSING DEVICE, INFORMATION PROCESSING METHOD, AND PROGRAM

CROSS-REFERENCE TO RELATED APPLICATION

The present application claims priority from Japanese Patent Application No. JP 2011-239041 filed in the Japanese Patent Office on Oct. 31, 2011, the entire content of which is incorporated herein by reference.

BACKGROUND

The present technology relates to an information processing device, and specifically relates to an information processing device which can perform thinning-out processing at an imaging device, and an information processing method thereof and a program causing a computer to execute this method.

In recent years, there have been spread imaging apparatuses such as digital still cameras and so forth which image a subject such as a person or the like to generate an imaged image, and record this generated imaged image. Also, as these imaging apparatuses, in order to simplify a user's imaging operations, there have widely been spread imaging apparatuses which have an auto-focusing (AF) function arranged to automatically perform focus (focal point) adjustment during imaging.

As such an imaging apparatus, for example, there has been proposed an imaging apparatus which performs auto-focusing using a contrast detecting method wherein multiple images are imaged while shifting the focal position, and a focal position having the highest contrast is taken as a focused focal position. Also, there has also been proposed an imaging apparatus which perform auto-focusing using a phase difference detecting method wherein light passed through an imaging lens is pupil-divided to form a pair of images, and an interval between the formed images is measured (phase difference is detected), thereby determining the position of the imaging lens.

Further, there has also been proposed an imaging apparatus which includes both of the contrast detecting method and phase difference detecting method. As such an imaging apparatus, for example, there has been proposed an imaging apparatus wherein both pixels of a pixel which pupil-divides light passed through an imaging lens (phase difference detecting pixel) and a pixel for generating an imaged image (image generating pixel) are provided to one imaging device (e.g., see Japanese Unexamined Patent Application Publication No. 2008-134389).

SUMMARY

With the above-mentioned related art, both pixels of a phase difference detecting pixel and an image generating pixel are provided to one imaging device, and accordingly, both the contrast detecting method and phase difference detecting method can be performed based on a signal read out from this imaging device.

Also, in the event that this imaging device has been realized with an X-Y address sensor such as a CMOS (Complementary Metal Oxide Semiconductor) sensor or the like, readout in increments of lines can be performed. That is to say, when imaging an image which does not have to have high resolution such as a live view image (monitor image) or the like, readout speed (frame rate) can be increased by performing thinning-out readout.

However, with this thinning-out readout, upon performing thinning-out so as to read out many phase difference detecting pixels, the percentage of phase difference detecting pixels increases. Upon the percentage of phase difference detecting pixels increasing, interpolation processing of pixel values of the positions of phase difference detecting pixels increases, and accordingly, image quality (the image quality of a live view image) is deteriorated. On the other hand, upon performing thinning-out so as to reduce phase difference detecting pixels, though precision for phase difference detection is deteriorated, interpolation processing for pixel values is reduced, and accordingly, image quality improves.

That is to say, it is desirable to suitably set thinning-out processing so as to satisfy both of image quality and focus performance.

It has been found to be desirable to suitably set thinning-out processing when reading out a signal from an imaging device.

A first embodiment of the present technology is an information processing device including: a detecting unit configured to detect a motion of a subject included in an image generated by an imaging device including multiple phase difference detecting pixels which generate a signal arranged to perform focus determination by phase difference detection, and multiple image generating pixels which generate a signal arranged to generate an image; and a determining unit configured to determine thinning-out processing when reading out a signal from the imaging device, according to the detected motion of a subject, and an information processing method thereof and a program causing a computer to execute this method. Thus, an operation is provided wherein thinning-out processing of the imaging device including the phase difference detecting pixels and image generating pixels is determined according to a motion of a subject.

Also, with this first embodiment, the thinning-out processing may include first processing arranged to generate an image using a signal read out from a line including the phase difference detecting pixels, and second processing arranged to generate an image using a signal read out from only a line not including the phase difference detecting pixels; with the determining unit determining, when the motion of a subject detected by the detecting unit during focus determination is great with a threshold as a reference, the first processing as the thinning-out processing, and when the motion of a subject is small with a threshold as a reference, determining the second processing as the thinning-out processing. Thus, an operation is provided wherein when the motion of a subject is great with a threshold as a reference, the first processing is set wherein a signal is read out from a line including the phase difference detecting pixels, and when the motion of a subject is small with a threshold as a reference, the second processing is set wherein a signal is read out from only a line not including the phase difference detecting pixels.

Also, with this first embodiment, the information processing device may further include a focusing control unit configured to perform, when the first processing is determined, focusing control based on focus determination by the phase difference detection, and to perform, when the second processing is determined, focusing control based on focus determination by contrast detection. Thus, upon the first processing being determined, focusing control is performed based on focus determination by phase difference detection, and upon the second processing being determined, focusing control is performed based on focus determination by contrast detection.

Also, with this first embodiment, an interval between lines to be read out in the first processing, and an interval between lines to be read out in the second processing may be the same. Thus, an operation is provided wherein, with the first processing and second processing, a signal is read out with the same interval between lines, and an imaged image is generated through similar signal processing.

Also, with this first embodiment, the determining unit may determine, when an imaging operation of a moving image is performed, third processing arranged to generate an image using a signal read out from only a line not including the phase difference detecting pixels regardless of the detected motion of a subject. Thus, an operation is provided wherein when an imaging operation of a moving image is performed, the third processing is determined as the thinning-out processing.

Also, with this first embodiment, the thinning-out processing may include first processing arranged to generate an image using a signal read out from a line including the phase difference detecting pixels, and second processing arranged to generate an image using a signal read out from only a line not including the phase difference detecting pixels; with the third processing being thinning-out processing arranged to add, with a line not including the phase difference detecting pixels, a signal from a pixel having the same wavelength of subject light to be detected before readout to equalize the number of lines to be read out in the third processing and the number of lines to be read out in the first processing. Thus, an operation is provided wherein, with the third processing, a signal from a pixel having the same wavelength of subject light to be detected is added before readout to equalize the number of lines to be read out in the third processing and the number of lines to be read out in the first processing.

Also, with this first embodiment, the information processing device may further include an operation accepting unit configured to accept a focusing mode specification operation; with the determining unit determining the thinning-out processing based on the accepted specification operation regardless of the detected motion of a subject. Thus, an operation is provided wherein in the event that a focusing mode specification operation by a user has been accepted, the thinning-out processing is determined based on the accepted specification operation regardless of the detected motion of a subject.

Also, with this first embodiment, the thinning-out processing may include first processing arranged to generate an image using a signal read out from a line including the phase difference detecting pixels, and second processing arranged to generate an image using a signal read out from only a line not including the phase difference detecting pixels; with the determining unit determining, when a focusing mode for high-speed focusing is specified, the first processing as the thinning-out processing, and when a focusing mode for giving preference to image quality over high-speed focusing is specified, determining the second processing as the thinning-out processing. Thus, an operation is provided wherein in the event a focusing mode for high-speed focusing has been specified, the first processing is determined as the thinning-out processing, and in the event that a focusing mode for giving preference to image quality over high-speed focusing has been specified, the second processing is determined as the thinning-out processing.

Also, with this first embodiment, the thinning-out processing may include fourth processing that is predetermined thinning-out processing, and fifth processing that is lower than the fourth processing in a signal percentage of the phase difference detecting pixels of signals to be read out; with the determining unit determining, when the motion of a subject detected by the detecting unit during focus determination is great with a threshold as a reference, the fourth processing as the thinning-out processing, and when the motion of a subject is small with a threshold as a reference, determining the fifth processing as the thinning-out processing. Thus, an operation is provided wherein when the motion of a subject is great with a threshold as a reference, the fourth processing that is predetermined thinning-out processing is set as the thinning-out processing, and when the motion of a subject is small with a threshold as a reference, the fifth processing that is lower than the fourth processing in a signal percentage of the phase difference detecting pixels is set as the thinning-out processing.

According to the present technology, an excellent advantage may be obtained wherein thinning-out processing when reading out a signal from an imaging device can suitably be set.

BRIEF DESCRIPTION OF THE DRAWINGS

FIG. 4 is a schematic diagram illustrating an example of a cross-sectional configuration of image generating pixels and phase difference detecting pixels according to the first embodiment of the present technology, and subject light to be received by the pixels;

FIGS. 10A and 10B are schematic diagrams indicating features of each mode of the readout modes that the readout mode determining unit according to the first embodiment of the present technology sets;

DETAILED DESCRIPTION OF EMBODIMENTS

Hereafter, modes for implementing the present technology (hereafter, referred to as embodiments) will be described. Description will be made in accordance with the following sequence.

1. First embodiment (imaging control: example wherein a readout mode at the time of focus adjustment is switched according to a motion of a subject)

2. Second embodiment (imaging control: example wherein a focus adjustment method at the time of focus adjustment is switched according to a motion of a subject)

1. First Embodiment

Internal Configuration Example of Imaging System

Figure 1:
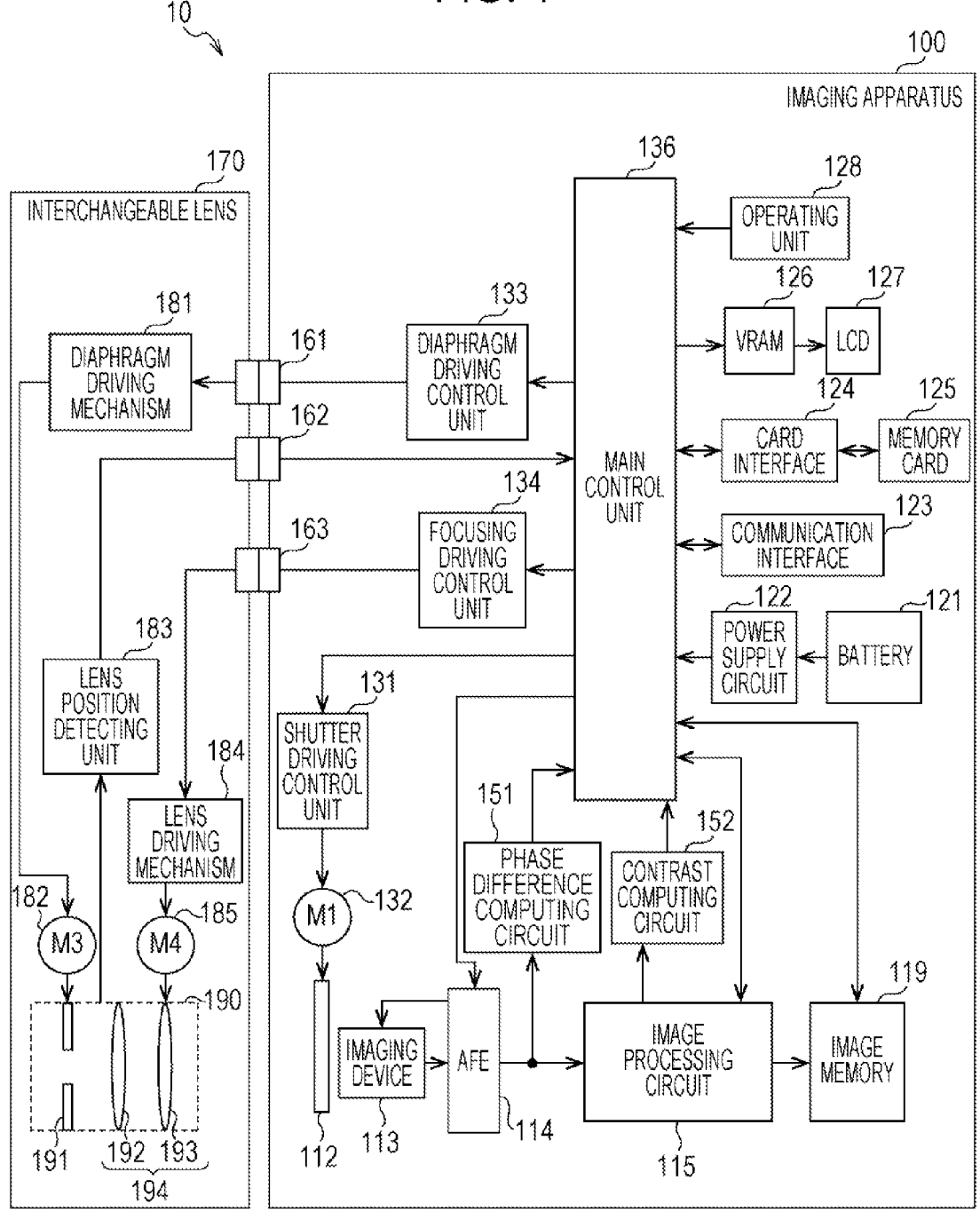
FIG. 1 is a schematic diagram illustrating an example of an internal configuration of an imaging system according to a first embodiment of the present technology.

FIG. 1 is a schematic diagram illustrating an example of the internal configuration of an imaging system 10 according to the first embodiment of the present technology. This imaging system 10 includes an imaging apparatus 100 and an interchangeable lens 170.

Note that, with the first embodiment of the present technology, the imaging system 10 is assumed to be a single-lens reflex camera of which the lens is changeable whereby images can be imaged. Note that in FIG. 1, for convenience of description, an internal configuration which is not frequently used at the time of imaging images (e.g., configuration regarding flash) will be omitted.

Also, FIG. 1 illustrates, for convenience of description, with regard to driving of a lens, only a configuration regarding driving of a focusing lens, and a configuration regarding driving of a zoom lens will be omitted.

The imaging apparatus 100 is to image a subject to generate image data (digital data), and to record this generated image data as an image content (still image content or moving image content). Note that, hereafter, there will principally be indicated an example wherein a still image content (still image file) is recorded as an image content (image file). This imaging apparatus 100 includes a shutter unit 112, an imaging device 113, AFE (Analog Front End) 114, an image processing circuit 115, and a phase difference computing circuit 151. Also, the imaging apparatus 100 includes image memory 119, a battery 121, a power supply circuit 122, a communication I/F (InterFace) 123, a card I/F 124, and a memory card 125. Further, the imaging apparatus 100 includes VRAM (Video Random Access Memory) 126, an LCD (Liquid Crystal Display) 127, an operating unit 128, and a shutter driving control unit 131. Also, the imaging apparatus 100 includes a shutter driving motor (M1) 132, a diaphragm driving control unit 133, a focusing driving control unit 134, a main control unit 136, and connection terminals 161 through 163.

The shutter unit 112 is to perform opening and shielding of an optical path for incident light from a subject which is input to the imaging device 113 using a curtain which moves in the vertical direction, and is driven by the shutter driving motor (M1) 132. Also, the shutter unit 112 supplies, in the event that the optical path is opened, incident light from a subject to the imaging device 113.

The imaging device 113 is to perform photoelectric conversion to an electric signal from incident light from a subject, and receives incident light from a subject to generate an analog electric signal. Also, the imaging device 113 is realized by a CMOS (Complementary Metal Oxide Semiconductor) sensor, for example. With the imaging device 113, pixels to generate a signal for generating an imaged image based on the received subject light (image generating pixels), and pixels to generate a signal for performing phase difference detection (phase difference detecting pixels) are arrayed.

Also, with the imaging device 113, as image generating pixels, pixels which receive red light (R pixels) using a color filter which transmits red (R) light, and pixels which receive green light (G pixels) using a color filter which transmits green (G) light are disposed. Also, with the imaging device 113, in addition to the R pixels and G pixels, as image generating pixels, pixels which receive blue light (B pixels) using a color filter which transmits blue (B) light are disposed. Note that the imaging device 113 will be described with reference to FIG. 4. The imaging device 113 supplies an electric signal (analog image signal) generated by photoelectric conversion thereof to the AFE 114.

The AFE 114 is to subject the analog image signal supplied from the imaging device 113 to predetermined signal processing, e.g., to subject the analog image signal to signal processing such as noise removal and signal amplification and so forth. The AFE 114 converts the image signal subjected to signal processing into a digital signal to generate a digital image signal. Also, the AFE 114 generates a timing pulse regarding an imaging operation of the imaging device 113 based on a reference clock supplied from the main control unit 136, and supplies the generated timing pulse thereof to the imaging device 113. Also, the AFE 114 supplies a signal relating to an operation of the imaging device 113, such as start or end notification of an exposure operation of the imaging device 113 that the main control unit 136 sets, or notification of output selection of each pixel of the imaging device 113, in sync with the generated timing pulse thereof. This AFE 114 supplies the generated digital image signal (pixel value) to the image processing circuit 115 and phase difference computing circuit 151.

The image processing circuit 115 is to subject the image signal supplied from the AFE 114 to predetermined signal processing to correct the image signal. This image processing circuit 115 performs black level correction, defect correction, shading compensation, color mixture correction, demosaic processing, white balance correction, gamma correction, or the like, for example. The image processing circuit 115 supplies the signal subjected to requisite processing (e.g., black level correction, defect correction, shading compensation, white balance correction) for detecting contrast at the contrast computing circuit 152 to the contrast computing circuit 152. Also, the image processing circuit 115 supplies the signal subjected to processing (e.g., the above-mentioned all corrections) requisite for displaying or recording an imaged image to the image memory 119.

Also, the image processing circuit 115 performs, at the time of recording processing of an imaged image in the memory card 125, playing processing of a recorded image, or the like, encoding processing or restoration processing of the image. For example, in the event of saving images (frames) consecutively imaged in the time sequence as a moving image, the image processing circuit 115 detects a motion vector from difference between frames, and performs encoding processing according to inter-frame prediction using this detected motion vector.

The phase difference computing circuit 151 is to detect, based on the image signal generated from the phase difference detecting pixels supplied from the AFE 114, shift of the focus using a phase difference detecting method. The phase difference detecting method mentioned here is a focal point detecting method for detecting a degree of focusing by pupil-divided light passed through the imaging lens to form a pair of images, and measuring (detecting phase difference) an interval between the formed images (shift amount between images). This phase difference computing circuit 151 performs, in order to perform auto-focusing (AF), computation for detecting shift in the focus of an object to be focused, and supplies information regarding the detected focus to the main control unit 136.

The contrast computing circuit 152 is to determine, based on the image signal supplied from the image processing circuit 115, whether or not the focus is focused by the contrast detecting method. Here, detection of a focal point according to the contrast detecting method is a focal point detecting method for imaging images while moving the focusing lens little at a time, and determining a position where an image with the highest contrast has been imaged to be a focused position. This contrast computing circuit 152 supplies information of a position where an image with the highest contrast has been imaged, driving information of the focusing lens for detecting an image with the highest contrast, and so forth to the main control unit 136.

The image memory 119 is to temporarily hold the image signal supplied from the image processing circuit 115. Also, this image memory 119 is used as a work area for performing predetermined processing on the image signal in accordance with a control signal from the main control unit 136. Note that this image memory 119 temporarily holds an image signal read out from the memory card 125.

The battery 121 is to supply power for operating the imaging system 10, and is configured of a secondary battery such as a nickel hydrogen battery or the like, for example. Also, the battery 121 supplies power to the power supply circuit 122.

The power supply circuit 122 is to convert the power supplied from the battery 121 into voltage for operating the units in the imaging system 10. For example, this power supply circuit 122 generates, when the main control unit 136 operates at voltage of 5 V, voltage of 5 V, and supplies the generated voltage to the main control unit 136. Also, the power supply circuit 122 supplies the generated voltage to the units in the imaging system 10. Note that FIG. 1 illustrates power supply lines from the power supply circuit 122 to the units in a partially omitted manner.

The communication I/F 123 is an interface to enable data transfer between an external device and the main control unit 136.

The card I/F 124 is an interface to enable data transfer between the memory card 125 and the main control unit 136.

The memory card 125 is a storage medium for holding image signals, and holds data supplied via the card I/F 124.

The VRAM 126 is buffer memory which temporarily holds an image to be displayed on the LCD 127, and supplies the held image thereof to the LCD 127.

The LCD 127 is to display an image based on the control of the main control unit 136, and is configured of a color liquid crystal panel, for example. This LCD 127 displays an imaged image, a recorded image, a mode setting screen, and so forth.

The operating unit 128 is to accept a user's operation, and in the event that a shutter button (not illustrated in the drawing) has been pressed for example, supplies a signal to inform pressing thereof to the main control unit 136. Also, the operating unit 128 supplies a signal relating to the user's operation to the main control unit 136.

The shutter driving control unit 131 is to generate, based on a shutter control signal supplied from the main control unit 136, a driving signal for driving the shutter driving motor (M1) 132, and supplies the generated driving signal to the shutter driving motor (M1) 132.

The shutter driving motor (M1) 132 is a motor to drive the shutter unit 112 based on the driving signal supplied from the shutter driving control unit 131.

The diaphragm driving control unit 133 is to generate a signal for controlling driving of diaphragm (diaphragm driving control signal) based on information regarding diaphragm to be supplied from the main control unit 136, and supplies the generated diaphragm driving signal thereof to the interchangeable lens 170 via the connection terminal 161.

The main control unit 136 is to control operations of the units of the imaging apparatus 100, and is configured of a microcomputer including ROM in which a control program is stored, for example.

The focusing driving control unit 134 is to generate, based on the information regarding focusing supplied from the main control unit 136, a driving amount signal indicating the driving amount of the lens. This focusing driving control unit 134 supplies the generated driving amount signal thereof to the interchangeable lens 170 via the connection terminal 163.

The interchangeable lens 170 including multiple lenses is to condense light of an image imaged by the imaging apparatus 100 and to form an image on an imaging face from the condensed light. This interchangeable lens 170 includes a diaphragm driving mechanism 181, a diaphragm driving motor (M3) 182, a lens position detecting unit 183, a lens driving mechanism 184, a lens driving motor (M4) 185, and a camera cone 190. Also, the camera cone 190 includes a diaphragm 191 and a lens group 194. Note that, with the lens group 194, for convenience of description, only a zoom lens 192 and focusing lens 193 are illustrated.

The diaphragm driving mechanism 181 is to generate, based on the diaphragm driving control signal supplied via the connection terminal 161, a driving signal for driving the diaphragm driving motor (M3) 182. This diaphragm driving mechanism 181 supplies the generated driving signal thereof to the diaphragm driving motor (M3) 182.

The diaphragm driving motor (M3) 182 is a motor for driving the diaphragm 191 based on the driving signal supplied from the diaphragm driving mechanism 181. This diaphragm driving motor (M3) 182 changes the diaphragm diameter of the diaphragm 191 by driving the diaphragm 191.

The lens position detecting unit 183 is to detect the positions of the zoom lens 192 and focusing lens 193 of the lens group 194. This lens position detecting unit 183 supplies information regarding the detected positions thereof (lens position information) to the imaging apparatus 100 via the connection terminal 162.

The lens driving mechanism 184 is to generate, based on the driving amount signal supplied via the connection terminal 163, a driving signal for driving the lens driving motor (M4) 185. This lens driving mechanism 184 supplies the generated driving signal thereof to the lens driving motor (M4) 185.

The lens driving motor (M4) 185 is a motor for diving the focusing lens 193 based on the driving signal supplied from the lens driving mechanism 184. This lens driving motor (M4) 185 adjusts the focus by driving the focusing lens 193.

The camera cone 190 is a portion where lenses making up the lens group 194 in the interchangeable lens 170 are installed.

The diaphragm 191 is a shielding object for adjusting the light amount of incident light from a subject to be input to the imaging apparatus 100.

The zoom lens 192 is to adjust the scale factor of a subject included in an imaged image by changing focal distance by moving the inside of the camera cone 190 in the optical axis direction.

The focusing lens 193 is to adjust the focus by moving the inside of the camera cone 190 in the optical axis direction.

Next, the function configuration of the imaging system 10 will be described with reference to FIG. 2.

Function Configuration Example of Imaging Apparatus

Figure 2:
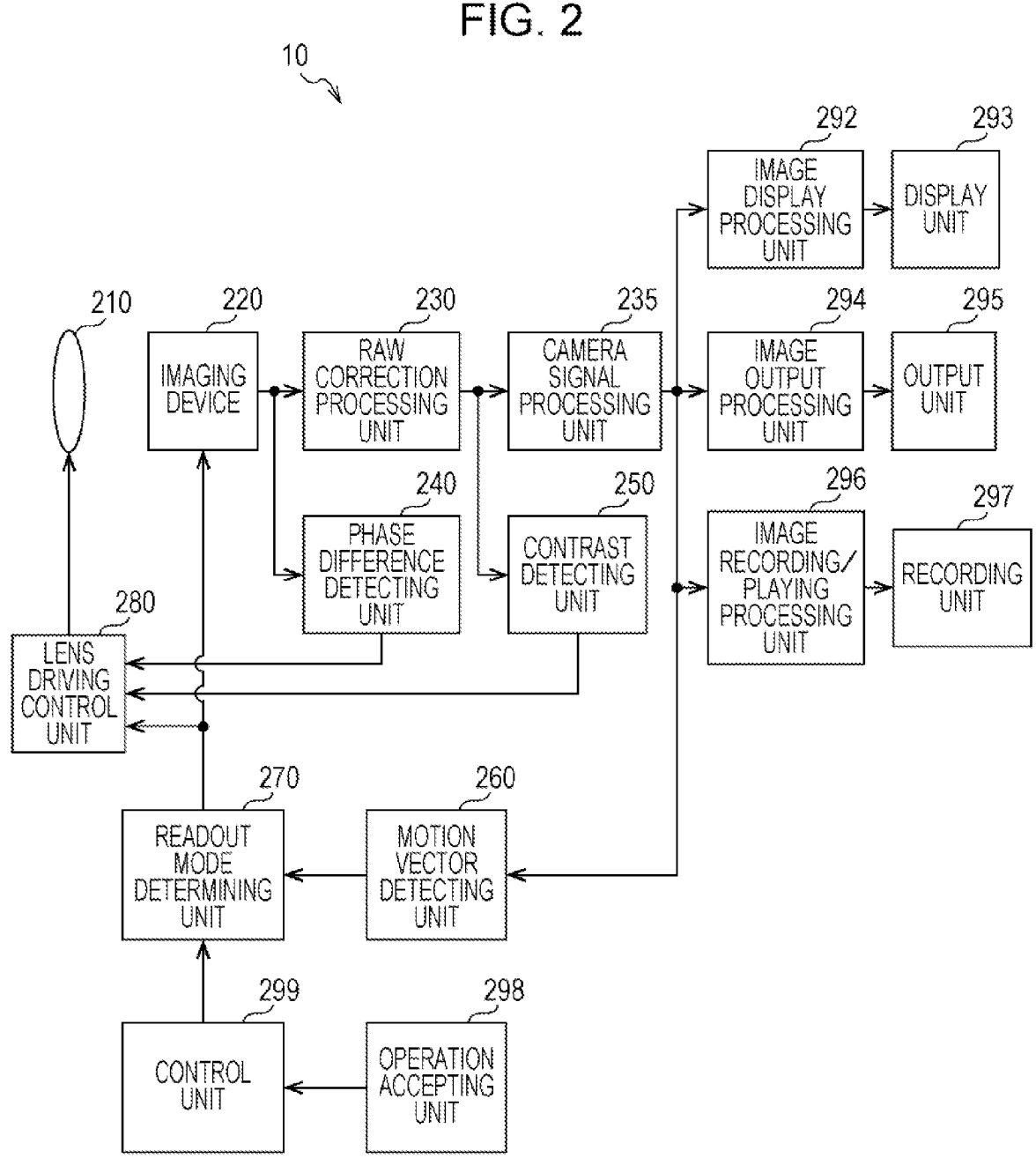
FIG. 2 is a block diagram illustrating an example of a function configuration regarding the imaging system according to the first embodiment of the present technology.

FIG. 2 is a block diagram illustrating an example of a function configuration regarding the imaging system 10 according to the first embodiment of the present technology.

The imaging system 10 includes a focusing lens 210, an imaging device 220, a RAW correction processing unit 230, a camera signal processing unit 235, a phase difference detecting unit 240, and a contrast detecting unit 250. Also, the imaging system 10 includes a motion vector detecting unit 260, a readout mode determining unit 270, and a lens driving control unit 280. Also, the imaging system 10 includes an image display processing unit 292, a display unit 293, an image output processing unit 294, an output unit 295, an image recording/playing processing unit 296, a recording unit 297, an operation accepting unit 298, and a control unit 299.

The focusing lens 210 is a lens for adjusting the focus by moving in the optical axis direction, and corresponds to the focusing lens 193 illustrated in FIG. 1.

The imaging device 220 is to generate an image signal by performing photoelectric conversion from incident light from a subject to an electric signal. With this imaging device 220, image generating pixels and phase difference detecting pixels are disposed. Note that an analog image signal generated by these pixels is subjected to noise removal or signal amplification by a correlated double sampling (CDS) circuit or auto gain control (AGC) circuit or the like. The generated analog image signal is subjected to A/D conversion, and supplied to the RAW correction processing unit 230 and phase difference detecting unit 240. Note that the imaging device 220 corresponds to the imaging device 113 illustrated in FIG. 1.

Also, the imaging device 220 sets, based on the readout mode supplied from the readout mode determining unit 270, a line to read out a signal, and a line not to read out a signal, and reads out a signal from each pixel of a line set as the line to read out a signal.

The RAW correction processing unit 230 is to subject the image signal supplied from the imaging device 220 to correction such as black level adjustment, pixel defect processing, white balance adjustment, shading correction processing, or the like. That is to say, the RAW correction processing unit 230 performs various types of correction processes so that real-time processing has to be available. This RAW correction processing unit 230 supplies the image data subjected to correction (RAW data) to the camera signal processing unit 235 and contrast detecting unit 250.

The camera signal processing unit 235 is to subject the RAW data supplied from the RAW correction processing unit 230 to camera signal processing such as pixel interpolation processing, color correction processing, edge correction, gamma correction, resolution conversion, or the like. The camera signal processing unit 235 supplies the data subjected to processing (image data) to the motion vector detecting unit 260, image display processing unit 292, image output processing unit 294, and image recording/playing processing unit 296. Note that the RAW correction processing unit 230 and camera signal processing unit 235 correspond to the image processing circuit 115 illustrated in FIG. 1.

The phase difference detecting unit 240 is to determine, based on a signal of a phase difference detecting pixel (pixel value) in the imaging device 220, whether or not an object to be focused is focused, using phase difference detection. The phase difference detecting unit 240 calculates focus shift amount (defocus amount), and supplies information indicating the calculated defocus amount (e.g., a value indicating the number of shifted pixels) to the lens driving control unit 280. Note that the phase difference detecting unit 240 corresponds to the phase difference computing circuit 151 illustrated in FIG. 1.

The contrast detecting unit 250 is to determine, based on the RAW data supplied from the RAW correction processing unit 230, whether or not the focus is focused by the contrast detecting method. For example, the contrast detecting unit 250 detects a lens position where an image having the highest contrast has been imaged of multiple images imaged for focus determination, and supplies information for moving the focus to the detected lens position to the lens driving control unit 280. Note that the contrast detecting unit 250 corresponds to the contrast computing circuit 152 illustrated in FIG. 1.

The motion vector detecting unit 260 is to detect a motion of a subject based on the image data supplied from the camera signal processing unit 235. For example, the motion vector detecting unit 260 detects a motion of a subject by detecting a motion vector of each object imaged in an image. The motion vector detecting unit 260 holds image data of an image (frame) imaged at the last in the time sequence, and detects shift of the subject by comparing this image data and image data of the latest frame supplied from the RAW correction processing unit 230. The motion vector detecting unit 260 then calculates a motion vector indicating the detected shift amount. Note that calculation of a motion vector by the motion vector detecting unit 260 is performed using a block matching method or the like, for example.

Note that detection of a motion vector by the motion vector detecting unit 260 is the same as with a motion vector to be calculated in inter-frame prediction at the time of compression of a moving image. Therefore, detection of a motion vector is performed at a circuit which performs moving image compression processing (image processing circuit 115 in FIG. 1) in the imaging apparatus 100.

The motion vector detecting unit 260 supplies information indicating summation (the motion of the entire image) of motion vectors (MV) detected from image data (in-plane MV summation information) to the readout mode determining unit 270. Note that the motion vector detecting unit 260 is an example of a detecting unit.

The readout mode determining unit 270 is to determine a readout pattern (readout mode) at the time of reading out a signal from each pixel of the imaging device 220. This readout mode determining unit 270 determines the readout mode based on a command from the control unit 299 and the in-plane MV summation information from the motion vector detecting unit 260. In the event that a moving image imaging command has been supplied from the control unit 299, the readout mode determining unit 270 determines to perform imaging in a mode for imaging a moving image (moving image thinning-out mode) of the readout modes. Also, in the event that the shutter button has been pressed, and a still image imaging command has been supplied from the control unit 299, the readout mode determining unit 270 determines to perform imaging in a mode for imaging a still image (all-pixel readout mode) of the readout modes.

Note that, with timing (e.g., a period before the shutter button is pressed) for adjusting the focus when imaging a still image, the readout mode detecting unit 270 determines the readout mode using the in-plane MV summation information from the motion vector detecting unit 260. In the event that a value indicating the in-plane MV summation information is great with a predetermined threshold as a reference at the time of focus adjustment, the readout mode determining unit 270 determines to perform imaging in a mode for performing focal point detection using the phase difference detecting method (phase difference thinning-out mode) of the readout modes.

Also, in the event that the value indicating the in-plane MV summation information is small with a predetermined threshold as a reference at the time of focus adjustment, the readout mode determining unit 270 determines to perform imaging in a mode for performing focal point detection using the contrast detecting method (contrast thinning-out mode) of the readout modes. Note that the moving image thinning-out mode will be described in FIG. 8, the all-pixel readout mode will be described in FIG. 5, the phase difference thinning-out mode will be described in FIG. 6, and the contrast thinning-out mode will be described in FIG. 7, and accordingly, description thereof will be omitted here.

The readout mode determining unit 270 supplies information indicating the determined readout mode (readout mode information) to the imaging device 220 and lens driving control unit 280. Note that the readout mode determining unit 270 is an example of a determining unit.

The lens driving control unit 280 is to control driving of the focusing lens 210. The lens driving control unit 280 drives the focusing lens 210 to be focused based on the readout mode information supplied from the readout mode determining unit 270, the information supplied from the phase difference detecting unit 240, and the information supplied from the contrast detecting unit 250.

For example, in the event that the readout mode information indicating the contrast thinning-out mode has been supplied, the lens driving control unit 280 causes the focus to be focused based on the information supplied from the contrast detecting unit 250. Also, in the event that the readout mode information indicating the phase difference thinning-out mode has been supplied, the lens driving control unit 280 causes the focus to be focused preferentially using the information supplied from the phase difference detecting unit 240. Note that in the event that the readout mode information indicating the phase difference thinning-out mode has been supplied, when phase difference detection is difficult (e.g., the luminance of an object to be focused is low), the lens driving control unit 280 causes the focus to be focused based on the information supplied from the contrast detecting unit 250. Note that a relation between the readout modes and a focus determining method (focal point determining method) will be described in detail in FIGS. 5 through 10, and accordingly, detailed description will be omitted here.

Note that the phase difference detecting unit 240, contrast detecting unit 250, and lens driving control unit 280 are an example of a focusing control unit.

The image display processing unit 292 generates an image to be displayed on the display unit 293 (display image), and supplies the generated image data to the display unit 293.

The display unit 293 is to display the image (imaged image) supplied from the image display processing unit 292. The display unit 293 displays a monitor image (live view image), a played image of an image recorded in the recording unit 297, and so forth, for example. This display unit 293 is realized with a color liquid crystal panel, for example. Note that the display unit 293 corresponds to the LCD 127 illustrated in FIG. 1.

The image output processing unit 294 generates an image to be output to an external device of the imaging apparatus 100, and supplies the generated image data to the output unit 295.

The output unit 295 is to output an image to an external device of the imaging apparatus 100. For example, in the event of providing an HDMI (High Definition Multimedia Interface) standard connector, the output unit 295 outputs the data supplied from the image output processing unit 294 in a data format conforming to this standard.

The image recording/playing processing unit 296 is to generate recording image data to be recorded in the recording unit 297 by subjecting the data supplied from the camera signal processing unit 235 to processing to compress data amount (encoding processing). For example, the image recording/playing processing unit 296 performs, in the event of recording a still image, compression processing in the JPEG (Joint Photographic Experts Group) system, and in the event of recording a moving image, performs compression processing in the MPEG (Moving Picture Experts Group) system. The image recording/playing processing unit 296 supplies the generated recording image data in the recording unit 297, and causes the recording unit 297 to record this.

Also, in the event of playing the recording image data recorded in the recording unit 297, the image recording/playing processing unit 296 subjects the recording image data supplied from the recording unit 297 to processing for restoring an image (restoration processing) to generate a playing image data. The generated playing image data is supplied to the image display processing unit 292 or image output processing unit 294, display of the playing image data on the display unit 293, or output to an external device is performed. Note that drawing of signal lines regarding playing is omitted in FIG. 2.

The recording unit 297 is to record the recording image data supplied from the image recording/playing processing unit 296 as an image content (image file). For example, as for this recording unit 297, there may be employed a removable recording medium (single or multiple recording media) such as a disc such as DVD (Digital Versatile Disc) or the like, semiconductor memory such as a memory card or the like. Also, these recording media may be housed in the imaging apparatus 100, or may be detachable from the imaging apparatus 100. Note that the recording unit 297 corresponds to the memory card illustrated in FIG. 1.

The operation accepting unit 298 is to accept the user's operation, and corresponds to the operating unit 128 illustrated in FIG. 1. For example, in the event of having accepted a selection operation for setting an imaging mode (still image imaging mode (still image mode) or moving image imaging mode (moving image mode)), this operation accepting unit 298 supplies a signal to inform the selection operation thereof to the control unit 299. Also, in the event of having accepted a selection operation to set a focusing control mode (auto, high-speed AF mode, high-quality AF (low-speed AF) mode) at the time of imaging a still image, the operation accepting unit 298 supplies a signal to inform the selection operation thereof to the control unit 299. Also, in the event that the shutter button (not illustrated) has been pressed, the operation accepting unit 298 supplies a signal to inform pressing thereof to the control unit 299.

The control unit 299 is to control the operations of the units in the imaging apparatus 100. Note that FIG. 2 illustrates signal lines alone relating to determination of the readout mode, and omits the others. For example, in the event that the imaging mode has been set by the user, the control unit 299 supplies a signal to inform the set imaging mode thereof to the readout mode determining unit 270. Also, in the event that a mode for adjusting the focus (focusing mode) has been set by the user, the control unit 299 supplies a signal to inform the set focusing mode thereof to the readout mode determining unit 270. Also, in the event that the shutter button has been pressed, the control unit 299 supplies a signal to inform pressing thereof to the readout mode determining unit 270.

Arrangement Example of Pixels in Imaging Device

Figure 3:
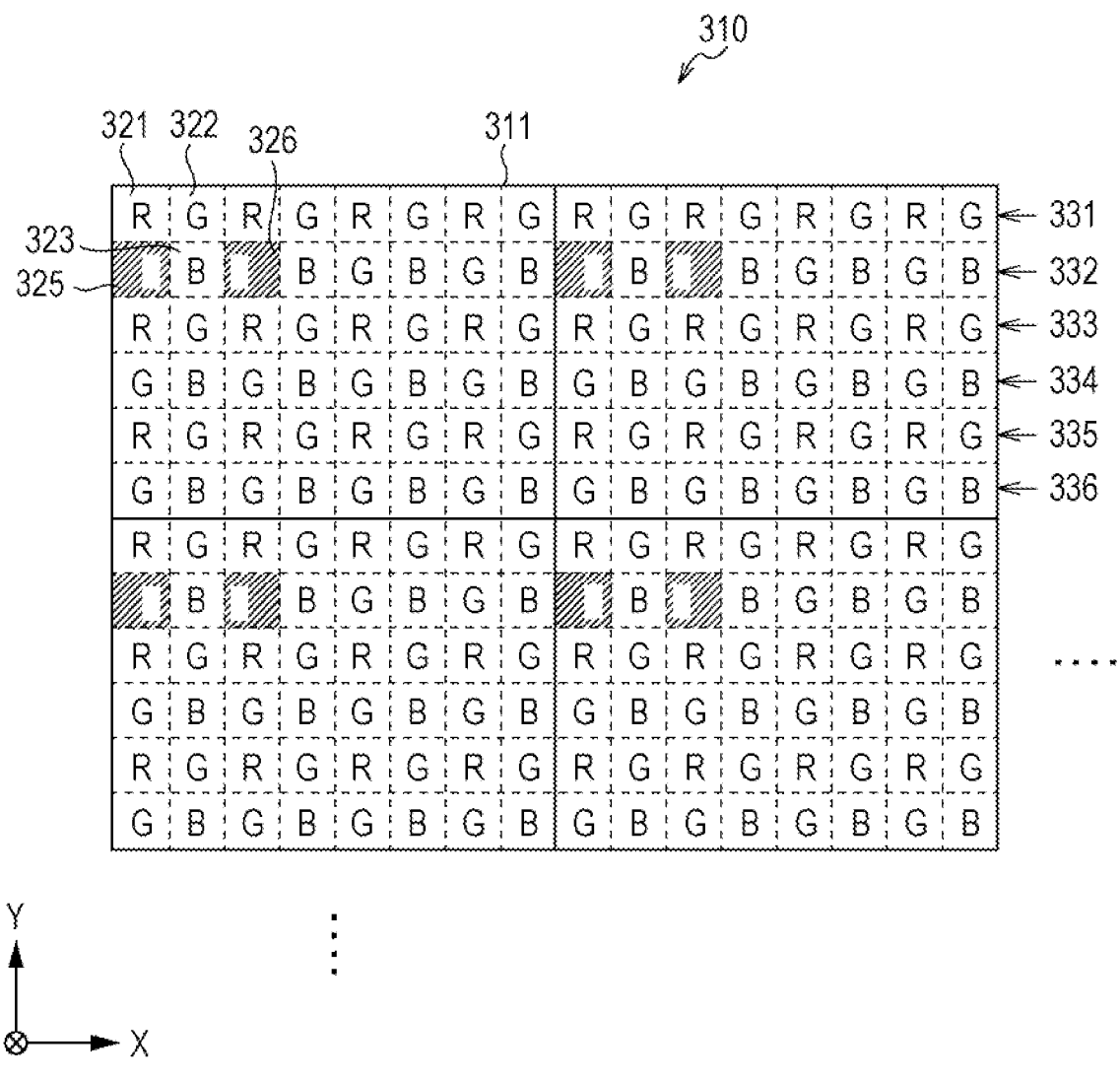
FIG. 3 is a schematic diagram illustrating an example of an arrangement of pixels to be provided to an imaging device according to the first embodiment of the present technology.

FIG. 3 is a schematic diagram illustrating an arrangement of pixels provided to the imaging device 220 according to the first embodiment of the present technology.

In FIG. 3, description will be made assuming X-Y axis with the vertical direction as Y axis, and the horizontal direction as X axis. Also, in the drawing, the lower left corner is taken as the origin in the X-Y axis, a direction from bottom up is taken as plus side in Y axis, and a direction from left to right is taken as plus side in X axis. Also, let us say that a signal readout direction in this imaging device 220 is the X axis direction (read out in increments of rows), and in the event of performing thinning-out readout, thinning-out is performed in increments of rows.

In FIG. 3, for convenience of description, description will be made using an area (area 310) of a part of pixels (pixels in 12 rows by 16 columns) of the pixels making up the imaging device 220. Note that the pixel arrangement in the imaging device 220 is an arrangement wherein an area (area 311) of a part of pixels (pixels in 6 rows by 8 columns) of the pixel arrangement illustrated in the area 310 is taken as one increment, and the pixel arrangement corresponding to this increment is repeated in the X axis direction and Y axis direction.

In the drawing, one pixel is illustrated with one square. Note that, in the drawing, the image generating pixels are illustrated with squares in which a mark (R/G/B) representing a provided color filter is indicated. Specifically, a R pixel 321 indicates a pixel (R pixel) which receives red light using a color filter which transmits red (R) light, and a B pixel 323 indicates a pixel (B pixel) which receives blue light using a color filter which transmits blue (B) light. Also, a G pixel 322 indicates a pixel (G pixel) which receives green light using a color filter which transmits green (G) light.

Also, the phase difference detecting pixels are illustrated with gray squares appended with a white rectangle. Note that the white rectangles in the phase difference detecting pixels indicate a side where incident light is received by a light receiving element (side not covered with a light-shielding layer for performing pupil division).

Now, the phase difference detecting pixels (right opening phase difference detecting pixel 325, left opening phase difference detecting pixel 326) illustrated in FIG. 3 will be described.

The right opening phase difference detecting pixel 325 is a phase difference detecting pixel wherein a light-shielding layer is formed so as to shield subject light passed through the right side of the exit pupil of subject light to be input to a micro lens of the right opening phase difference detecting pixel 325. That is to say, this right opening phase difference detecting pixel 325 shields the right-side light of light pupil-divided to the left and right (plus and minus sides of the X axis direction) of the exit pupil, and receives the left-side pupil-divided light.

The left opening phase difference detecting pixel 326 is a phase difference detecting pixel wherein a light-shielding layer is formed so as to shield subject light passed through the left side of the exit pupil of subject light to be input to a micro lens of the left opening phase difference detecting pixel 326. That is to say, this left opening phase difference detecting pixel 326 shields the left-side light of light pupil-divided to the left and right (plus and minus sides of the X axis direction) of the exit pupil, and receives the right-side pupil-divided light. Also, the left opening phase difference detecting pixel 326 is employed as a pair with the right opening phase difference detecting pixel 325, thereby forming a pair of images.

Now, the arrangement of the pixels in the imaging device 220 will be described. Note that description will be made focusing attention on an area 311 which is arrangement increments to be repeated.

The arrangement of pixels in the area 311 is, as illustrated in FIG. 3, made up of three types of rows (Gr lines, Gb lines, and AF lines). The Gr lines (Gr lines 331, 333, and 335) are rows where the R pixel 321 and G pixel 322 are alternately disposed in the row direction, and Gb lines (Gb lines 334 and 336) are rows where the G pixel 322 and B pixel 323 are alternately disposed in the row direction. Also, the AF line (AF line 332) is, with a row (Gb line) where the G pixel 322 and B pixel 323 are alternately disposed in the row direction, either the right opening phase difference detecting pixel 325 or left opening phase difference detecting pixel 326 is disposed instead of a part of the G pixels 322. Note that, in order to perform pupil division with suitable precision, it is desirable that an interval between the right opening phase difference detecting pixel 325 and left opening phase difference detecting pixel 326 (the number of image generating pixels to be disposed in a manner sandwiched between these two pixels) is small. Therefore, with the first embodiment of the present technology, the right opening phase difference detecting pixel 325 and left opening phase difference detecting pixel 326 are disposed in a manner sandwiching one B pixel 323. Also, the lines of the area 311 are disposed so that the lines of an area adjacent in the row direction become that same lines.

That is to say, with the imaging device 220, multiple rows where the image generating pixels alone are disposed (Gr lines and Gb lines), and one row where the phase difference detecting pixels are partially disposed (AF line) are alternately disposed in a direction (column direction) orthogonal to a readout direction (row direction). FIG. 4 illustrates an example wherein the number of consecutive image generating pixels alone is five rows. Note that, with the rows of consecutive image generating pixels, the image generating pixels are positioned in a Bayer array.

Note that with regard to the arrangement of the pixels in the imaging device 220, other various patterns can be conceived. With the arrangement of the pixels, multiple rows where the image generating pixels alone are disposed, and one row where the phase difference detecting pixels are partially disposed have to alternately be disposed. That is to say, in FIG. 3, though an area (area 311) of pixels of six rows by eight columns including one row of the AF line are taken as increments, there may also be conceived a case where the Gr lines and Gb lines are further increased to expand an interval of the AF lines, or a case where the pixels in the column direction are increased to expand an interval of a pair of the phase difference detecting pixels, or the like.

Also, as illustrated in FIG. 3, with the first embodiment of the present technology, for convenience of description, though description has been made illustrating only a pair of the right opening phase difference detecting pixels and left opening phase difference detecting pixels, the arrangement of the pixels is not restricted to this. It may also be conceived that a pair of the phase difference detecting pixels (upper opening phase difference detecting pixels, lower opening phase difference detecting pixels) to be pupil-divided into the upper and lower sides (plus and minus sides in the Y axis direction) of the exit pupil are disposed. In the event of disposing phase difference detecting pixels to be pupil-divided into up and down, the pixels are arranged so as to detect shift in the column direction of the image, and so as to array in one column in the column direction. Note that both of a pair of a right opening phase difference detecting pixel and a left opening phase difference detecting pixel, and a pair of an upper opening phase difference detecting pixel and a lower opening phase difference detecting pixel are arranged, and accordingly, in the event that it is difficult to detect phase difference by one pair, this is supplemented by the other pair, and accordingly, precision of detection according to phase difference is improved. Also, even in the event that an upper opening phase difference detecting pixel and a lower opening phase difference detecting pixel are arranged along with a right opening phase difference detecting pixel and a left opening phase difference detecting pixel as well, multiple rows where the image generating pixels alone are disposed, and a row where the phase difference detecting pixels are partially disposed are alternately disposed.

Next, the cross-sectional configurations of the image generating pixels and the cross-sectional configurations of the phase difference detecting pixels according to the first embodiment of the present technology will be described using the cross-sectional configurations of the B pixel, right opening phase difference detecting pixels, and left opening phase difference detecting pixels illustrated in the drawing.

Next, the cross-sectional configurations of the image generating pixels and the cross-sectional configurations of the phase difference detecting pixels according to the first embodiment of the present technology will be described with reference to FIG. 4.

Cross-sectional Configuration Example of Image Generating Pixels and Phase Difference Detecting Pixels FIG. 4 is a schematic diagram illustrating an example of the cross-sectional configurations of the image generating pixels and phase difference detecting pixels according to the first embodiment of the present technology, and subject light that the pixels receive.

FIG. 4 schematically illustrates the cross-sectional configurations of four pixels of the AF line 332 including the right opening phase difference detecting pixel 325 and left opening phase difference detecting pixel 326, and an exit pupil (exit pupil 340) which is a diaphragm shape as viewed from these pixels. Note that the exit pupil is originally a shape approximate to a circle, but for convenience of description, FIG. 4 illustrates an exit pupil (elliptical shape) of which the Y axis direction is shortened. Note that FIG. 4 illustrates a cross-sectional configuration with the horizontal direction as the X axis direction and with the vertical direction as the Z axis direction. Also, in FIG. 4, the cross-sectional configurations of an image generating pixel and phase difference detecting pixel around the center (on the axis) of the imaging device 220 will be described.

In FIG. 4, as the cross-sectional configurations of four pixels, in order from the left, the cross-sectional configurations of a right opening phase difference detecting pixel 325, a B pixel 323, a left opening phase difference detecting pixel 326, and a B pixel 323 are illustrated. Note that the cross-sectional configurations of the pixels differ only in the color of a color filter and the shape of a wiring layer, and accordingly, in the drawing, the cross-sectional configuration of the right opening phase difference detecting pixel 325 will be described, and the other pixels will be described focusing attention on difference thereof.

As for the cross-sectional configuration of the right opening phase difference detecting pixel 325, there are illustrated an on-chip lens 351, a W filter 352, a wiring layer 354, and a light-receiving element 355.

The on-chip 351 is a micro lens for condensing subject light in the light-receiving element 355. Note that, with the imaging device 220, an on-chip lens having the same physical configuration (diameter and curvature) is provided to all of the pixels. That is to say, the on-chip lens 351 of the right opening phase difference detecting pixel 325 is the same on-chip lens as the on-chip lenses of the B pixel 323 and left opening phase difference detecting pixel 326.

The W filter 352 is a filter (W filter) which transmits light in a visible light area, but absorbs light of the other wavelengths, and is an on-chip color filter (OCCF; On Chip Color Filter) provided to a phase difference detecting pixel. Note that, with the first embodiment of the present technology, it is assumed that a W filter is provided to the phase difference detecting pixels (right opening phase difference detecting pixel and left opening phase difference detecting pixel) as a color filter. Note that a layer in which the W filter 352 is disposed is a layer to which a color filter is provided, and with the image generating pixels, a filter which transmits a light color (R, G, B) that the pixels receive is provided to this layer.

The wiring layers 353 and 354 are wiring layers (metal layers) for connecting the circuits in a pixel. FIG. 4 illustrates that the wirings of the three layers are disposed in layer shape as to the optical axis. Now, with the embodiment of the present technology, let us say that between the on-chip lens 351 and the light-receiving element 355, in order from a closer side to the on-chip lens 351, there will be referred to as first metal, second metal, and third metal. The second metal and third metal are used as wirings which passes through the electric signal of each circuit in a pixel, and the first metal is used as ground.

Note that the first metal also serves as a light-shielding layer for preventing light which has not transmitted an on-chip lens of a pixel thereof from being received at the light-receiving element of the pixel thereof.

Now, difference between the wiring layer 353 and wiring layer 354 will be described. With the wiring layer 354, the third metal protrudes so as to cover a left half of the light-receiving element 355. According to this protrusion, subject light (subject light passing through between two chained lines (line 343 and line 344)) passed through a right half (Lr 347) of the exit pupil 340 is shielded, and is not received at the light-receiving element 355. On the other hand, the third metal of the wiring layer 353 is not disposed on the optical path of subject light from the on-chip lens 351 to the light-receiving element 355, and is disposed around this optical path. Thus, subject light (subject light passing through between two dashed lines (line 341 and line 342))) passed through a left half (Ll 346) of the exit pupil 340 is not shielded, and is received at the light-receiving element 355.

In this way, the light-receiving face of the light-receiving element 355 is covered with a metal layer (third metal) closest to the light-receiving element 355, thereby separating (pupil-dividing) light flux from the left side portion of the exit pupil and light flux from a right half.

Note that, with the B pixel 323, the third metal covers the light-receiving element 355, and accordingly, does not protrude. Therefore, both of subject light passed through the right half (Lr 347) of the exit pupil 340, and subject light passed through the left half (Ll 346) can be received.

Also, with the left opening phase difference detecting pixel 326, the third metal protrudes so as to cover a right half of the light-receiving element. According to this protrusion, subject light passed through the left half (L1 346) of the exit pupil 340 is shielded.

The light-receiving element 355 is to convert received light into an electric signal (photoelectric conversion), thereby generating the electric signal having intensity according to the amount of the received light. This light-receiving element 355 is configured of a photo diode (PD), for example. Note that, with the imaging device 220, the size of the light-receiving element is the same regarding all of the pixels. Specifically, the light-receiving elements of the phase difference detecting pixels and the light-receiving elements of the image generating pixels have the same size, and with the imaging device 220, pixels having the same size are adjacently disposed with an equal interval in the horizontal and vertical directions.

In this way, with the phase difference detecting pixels, the light-receiving element is covered with the third metal, receiving of light from a particular area of the exit pupil is prevented, and accordingly, pupil division is performed. Note that, though the cross-sectional configurations of the left and right opening phase difference detecting pixels have been described in FIG. 4, in the case of the upper and lower opening phase difference detecting pixels, the third metal extrudes so as to cover the lower half or upper half of the light-receiving element.

Note that FIG. 4 illustrates an example of the cross-sectional configurations of the image generating pixels and phase difference detecting pixels around the center (on the axis) of the imaging device 220. However, a degree of the protrusion of the third metal for a phase difference detecting pixel performing pupil division is changed depending on image height and pupil distance. In the event that image height has changed, the angle of the principal ray to be input to a phase difference detecting pixel is changed. Therefore, the imaging device is generated so as to change the degree of the protrusion of the third metal according to the angle of the principal ray (so that the principal ray shines on an edge on the protruding side of the third metal), and so as to suitably receive light passed through the right half or left half of the exit pupil 340 with each image height. Note that even in the event that the pupil distance has changed, the angle of the principal ray has changed, and accordingly, the imaging device is generated so as to handle multiple interchangeable lenses, an so as to suitably receive light passed through the right half or left half of the exit pupil 340 in multiple pupil distances with each image height.

Next, each mode of the readout modes that the readout mode determining unit 270 determines will be described with reference to FIGS. 5 through 8.

Readout Example of All-pixel Readout Mode

Figure 5A:
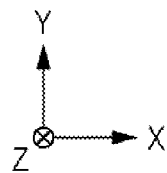
FIGS. 5A and 5B are schematic diagrams illustrating a signal readout example in the event that a readout mode determining unit according to the first embodiment of the present technology has determined imaging in an all-pixel readout mode.
Figure 5B:
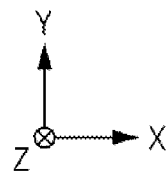

FIGS. 5A and 5B are schematic diagrams illustrating a signal readout example in the event that the readout mode determining unit 270 according to the first embodiment of the present technology has determined imaging in the all-pixel readout mode.

FIG. 5A illustrates pixels (area 411) in 24 rows×13 columns, and illustrates the position of a pixel from which a signal is read out at the time of reading out a signal in the all-pixel readout mode. Also, FIG. 5B illustrates multiple pixels (area 415) indicating the size of an imaged image to be generated from a signal read out in the all-pixel readout mode. Note that in FIGS. 5A through 8B, a pixel from which a signal is read out is illustrated in the same way as with FIG. 4, and a pixel from which no signal is read out is illustrated with a rectangle appended with cross hatching.

As illustrated in the area 411 in FIG. 5A, in the all-pixel readout mode, a signal is read out from all of the pixels of the image generating pixels and phase difference detecting pixels. Specifically, as illustrated in the area 415 in FIG. 5B, in the all-pixel readout mode, the data of the number of pixels in 24 rows×13 columns is generated from the signals (pixel values) of pixels (area 411) in 24 rows×13 columns.

Readout Example in Phase Difference Thinning-Out Mode

Figures 6A, 6B:
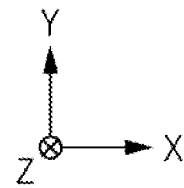
FIGS. 6A and 6B are schematic diagrams illustrating a signal readout example in the event that the readout mode determining unit according to the first embodiment of the present technology has determined imaging in a phase difference thinning-out mode.

FIGS. 6A and 6B are schematic diagrams illustrating a readout example of a signal in the event that the readout mode determining unit 270 according to the first embodiment of the present technology has determined imaging in the phase difference thinning-out mode.

Note that in FIGS. 6A and 6B, description will be made using an area of pixels in 24 rows×13 columns in the same way as with FIG. 5A.

FIG. 6A illustrates pixels (area 421) in 24 rows×13 columns in the same way as with FIG. 5A, and illustrates the position of a pixel from which a signal is read out at the time of reading out a signal in the phase difference thinning-out mode. Note that in FIG. 6A, a pixel from which a signal is read out is illustrated in the same way as with FIG. 4, and a pixel from which no signal is read out is illustrated with a rectangle (rectangle 422) appended with cross hatching. Also, FIG. 6B illustrates multiple pixels (area 425) schematically illustrating the size of an imaged image to be generated from a signal to be read out in the area 421 in FIG. 6A.

As illustrated in the area 421 in FIG. 6B, in the phase difference thinning-out mode, a signal is read out every two rows (vertical 1/3thinning out to read out one row in three rows) so as to read a line (AF line) including a phase difference detecting pixel. With the area 421 illustrated in FIG. 6B, the 2nd, 5th, 8th, 11th, 14th, 17th, 20th, and 23rd rows are read out. In this way, the number of rows read out is reduced to 1/3, and accordingly, time for readout of signals becomes around 1/3as compared to the all-pixel readout mode in FIGS. 5A and 5B. That is to say, the data of all field angles within a frame can be read out at triple speed as to the all-pixel readout mode.

Thus, as illustrated in the area 425 in FIG. 6B, in the phase difference thinning-out mode, the data of pixels in 8 rows×13 columns is generated from the signals of pixels (area 421) in 24 rows×13 columns. Note that the signals (pixel values) of the phase difference detecting pixels of the readout signals are used for phase difference detection at the phase difference detecting unit 240. On the other hand, the signals (pixel values) of the image generating pixels are supplied to the RAW correction processing unit 230, and are subjected to image correction processing for display of an imaged image (live view image), or detection of a motion vector at the motion vector detecting unit 260. That is to say, in the phase difference thinning-out mode, an image is generated using a signal read out from a line including a phase difference detecting pixel. Note that, in the event that focus determination is not performed using the phase difference detecting method (e.g., in the event that a subject is dark so as not to detect phase difference), focal point detection according to the contrast detecting method is performed by the contrast detecting unit 250 using the pixel values of the image generating pixels.

Readout Example in Contrast Thinning-out Mode

Figure 7A:
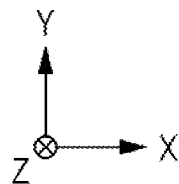
FIGS. 7A and 7B are schematic diagrams illustrating a signal readout example in the event that the readout mode determining unit according to the first embodiment of the present technology has determined imaging in a contrast thinning-out mode.
Figure 7B:
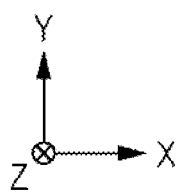

FIGS. 7A and 7B are schematic diagrams illustrating a readout example of a signal in the event that the readout mode determining unit 270 according to the first embodiment of the present technology has determined imaging in the contrast thinning-out mode.

Note that in FIGS. 7A and 7B, description will be made using an area of pixels in 24 rows×13 columns in the same way as with FIG. 5A.

FIG. 7A illustrates pixels (area 431) in 24 rows×13 columns in the same way as with FIG. 5A, and illustrates the position of a pixel from which a signal is read out at the time of reading out a signal in the contrast thinning-out mode. Also, FIG. 7B illustrates multiple pixels (area 435) schematically illustrating the size of an imaged image to be generated from a signal to be read out in the area 431 in FIG. 7A.

As illustrated in the area 431 in FIG. 7A, in the contrast thinning-out mode, a signal is read out every two rows (vertical 1/3 thinning out to read out one row in three rows) so as not to read the AF line. With the area 431 illustrated in FIG. 7A, the 1st, 4th, 7th, 10th, 13th, 16th, 19th, and 22nd rows (8 rows in total) are read out. That is to say, in the same way as with the phase difference thinning-out mode, the data of all field angles within a frame can be read out at triple speed as to the all-pixel readout mode. However, the AF line is not read out, and accordingly, detection of a focal point fails to be performed using the phase difference detecting method. Note that only lines including the image generating pixels alone are read out without reading the AF line, and accordingly, the pixel values of the phase difference detecting pixels do not have to be interpolated, and image quality is improved as compared to the phase difference thinning-out mode. In this way, in the contrast thinning-out mode, an image is generated using a signal read out from only a line not including a phase difference detecting pixel. Also, in the contrast thinning-out mode, the number (percentage) of phase difference detecting pixels from which a signal is read out is small as compared to the phase difference thinning-out mode.

Readout Example in Moving Image Thinning-out Mode

Figure 8A:
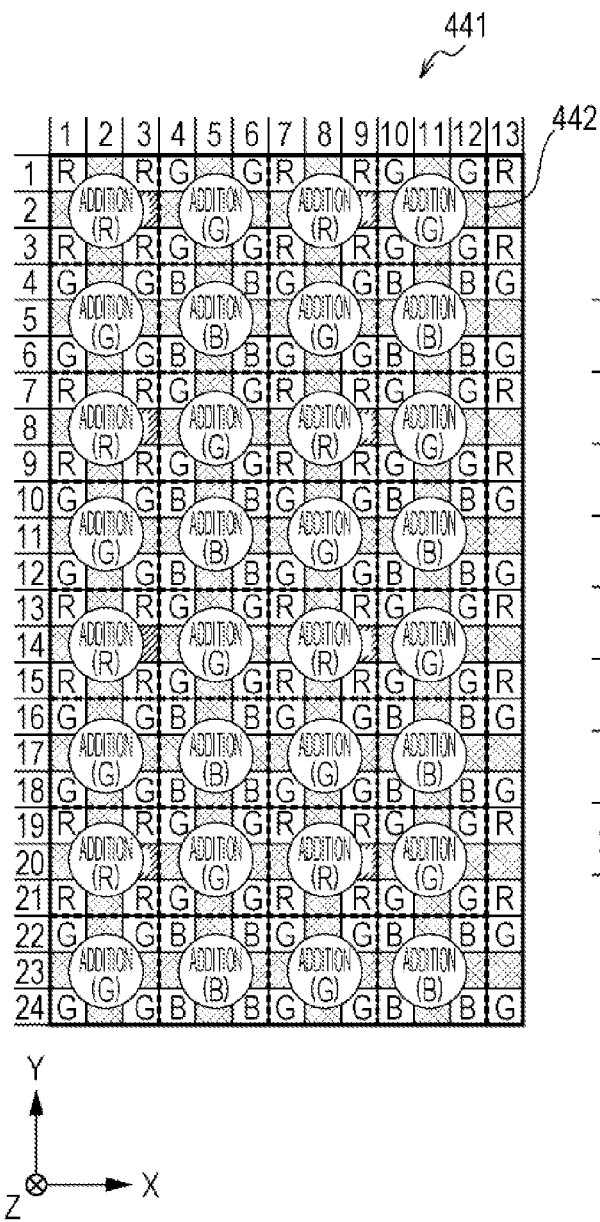
FIGS. 8A and 8B are schematic diagrams illustrating a signal readout example in the event that the readout mode determining unit according to the first embodiment of the present technology has determined imaging in a moving image thinning-out mode.
Figure 8B:
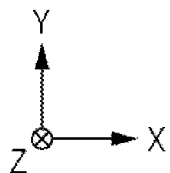

FIGS. 8A and 8B are schematic diagrams illustrating a readout example of a signal in the event that the readout mode determining unit 270 according to the first embodiment of the present technology has determined imaging in the moving image thinning-out mode.

FIG. 8A illustrates pixels (area 441) in 24 rows×13 columns in the same way as with FIG. 5A, and illustrates the position of a pixel from which a signal is read out at the time of reading out a signal in the moving image thinning-out mode. Also, FIG. 8B illustrates multiple pixels (area 445) schematically illustrating the size of an imaged image to be generated from a signal to be read out in the area 441 in FIG. 8A.

Readout of signals in the moving image thinning-out mode will be described with reference to FIG. 8A.

In the moving image thinning-out mode, thinning in 1/3row and 1/3column is performed, and also signals are added and then read out. In the moving image thinning-out mode, rows from which no signal is read out (rows to be thinned) are set every two rows so as to include the AF line. That is to say, in the moving image thinning-out mode, the rows which have been read out in the phase difference thinning-out mode (see FIGS. 6A and 6B) are set as rows from which no signal is read out. Also, in the moving image thinning-out mode, columns from which no signal is read out are set every two columns in the column direction. As illustrated in FIG. 8A, the signals of four image generating pixels having the same color of 3 rows×3 columns are added and read out. FIG. 8A illustrates an area in 3 rows×3 columns which are added and read out, using a dashed-line frame (area 442).

In the moving image thinning-out mode, rows and columns from which no signal is read out are set, and also the signals of image generating pixels having the same color are added, and the added signal is output from the imaging device 220. Thus, as illustrated in the area 445 in FIG. 8B, an image of pixels in 8 rows is generated. That is to say, though the number of rows of pixels from which a signal is read out is 2/3as to the all-pixel readout mode, the number of rows (lines) at the time of reading out a signal becomes 1/3as to the all-pixel readout mode. Thus, in same way as with the phase difference thinning-out mode and contrast thinning-out mode, time for reading out a signal becomes around 1/3(triple in speed) as to the all-pixel readout mode. Also, though the number of pixels is small, the number of pixels from which a signal is read out is great as compared to the contrast thinning-out mode wherein simply 1/3 rows are thinned, and accordingly, sensitivity improves. That is to say, an image suitable for imaging of a moving image which demands a high frame rate can be obtained.

As illustrated in FIGS. 5A through 8B, with the first embodiment of the present technology, as the readout modes of the imaging device 220, four types of modes are set. The readout mode determining unit 270 determines, when imaging a still image, the all-pixel readout mode to be the readout mode, and when imaging a moving image, determines the moving image thinning-out mode to be the readout mode. Also, with regard to the readout mode at the time of focus adjustment when imaging a still image, the readout mode determining unit 270 determines either the contrast thinning-out mode or the phase difference thinning-out mode described in FIGS. 6A through 7B to be the readout mode. In the event that either the contrast thinning-out mode or the phase difference thinning-out mode has been determined by the user's operation (in the event that the focusing mode has been specified), the readout mode determining unit 270 determines the mode according to the determination thereof. Also, in the event that automatic determination (auto) has been set for determination regarding which of the contrast thinning-out mode and the phase difference thinning-out mode is to be used, the readout mode determining unit 270 determines the mode based on the in-plane MV summation information supplied from the motion vector detecting unit 260.

Next, description will be made regarding a relation between a value that the in-plane MV summation information supplied from the motion vector detecting unit 260 and the readout mode (contrast thinning-out mode or phase difference thinning-out mode) that the readout mode determining unit 270 determines, with reference to FIG. 9.

Relation Example between In-plane MV Summation Value and Readout Mode

Figure 9:
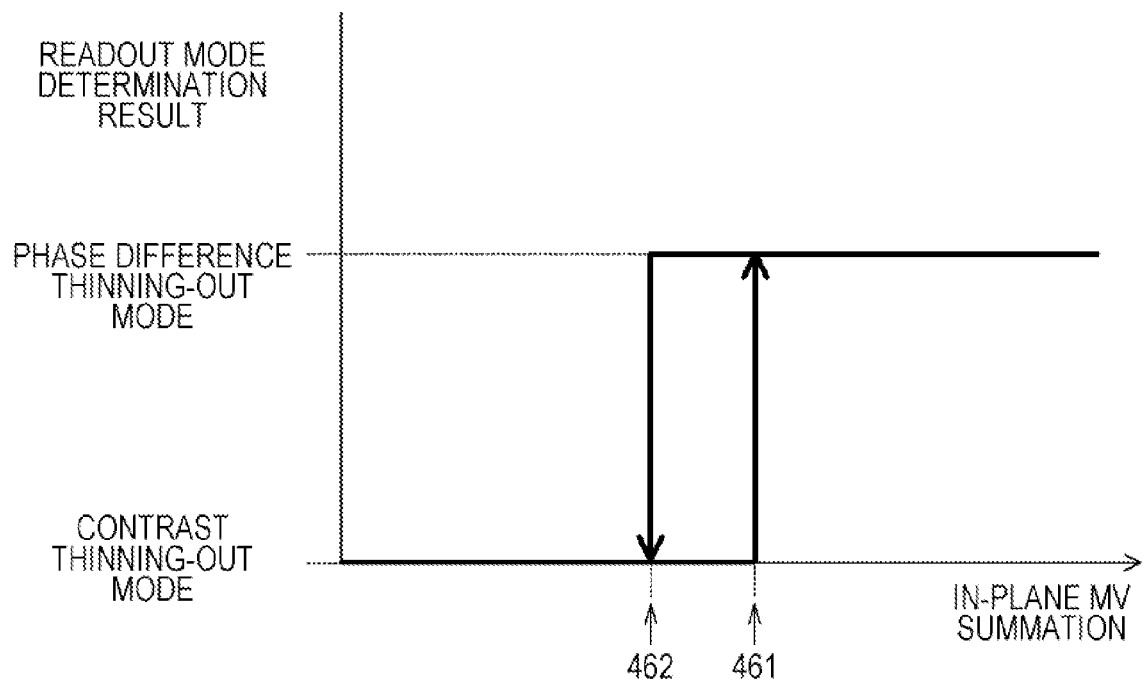
FIG. 9 is a schematic diagram illustrating a relation between in-plane MV summation that a motion vector detecting unit according to the first embodiment of the present technology calculates and a readout mode (contrast thinning-out mode or phase difference thinning-out mode) that the readout mode determining unit determines.

FIG. 9 is a schematic diagram illustrating a relation between in-plane MV summation that the motion vector detecting unit 260 according to the first embodiment of the present technology and the readout mode (contrast thinning-out mode or phase difference thinning-out mode) that the readout mode determining unit 270 determines.

FIG. 9 illustrates a graph illustrating a relation between an in-plane MV summation value and the readout mode with the horizontal axis as an axis indicating in-plane MV summation (a value that in-plane MV summation information indicates), and with the vertical axis as a determination result of the readout mode (contrast thinning-out mode or phase difference thinning-out mode). Now, let us say that, with the horizontal axis, the left side in the drawing is taken as a side where the in-plane MV summation is low, and the right side in the drawing is taken as a side where the in-plane MV summation is high.

With this graph, there are indicated a threshold (first threshold 461) serving as a reference for determination of switching from the contrast thinning-out mode to the phase difference thinning-out mode, and a threshold (second threshold 462) serving as a reference for determination of switching from the phase difference thinning-out mode to the contrast thinning-out mode.

As illustrated in FIG. 9, with the readout mode when adjusting the focus at the time of imaging of a still image, when the in-plane MV summation is great, the phase difference thinning-out mode is determined, and when the in-plane MV summation is small, the contrast thinning-out mode is determined. Note that, in order to prevent erroneous detection due to noise in an image or the like from occurring, hysteresis is applied to determination of the readout mode. Therefore, the two thresholds (first threshold 461 and second threshold 462) are set. When the in-plane MV summation exceeds (not less than or greater than) the first threshold 461 of which the value is greater than the value of the second threshold 462, the readout mode is switched from the contrast thinning-out mode to the phase difference thinning-out mode. On the other hand, when the in-plane MV summation falls below (less than or smaller than) the second threshold 462, the readout mode is switched from the phase difference thinning-out mode to the contrast thinning-out mode. In other words, when the in-plane MV summation exceeds the first threshold 461, the readout mode is changed to the phase difference thinning-out mode, and when the in-plane MV summation falls below the second threshold 462, the readout mode is changed to the contrast thinning-out mode. Also, when the in-plane MV summation is between the second threshold 462 and the first threshold 461, of the contrast thinning-out mode and phase difference thinning-out mode, the mode set at the last imaging (imaging of the last frame) is set as the readout mode.

In this way, the readout mode when adjusting the focus at the time of imaging of a still image is switched between the contrast thinning-out mode and phase difference thinning-out mode according to the motion (in-plane MV summation) of a subject. Note that, though the threshold serving as a reference for determination of switching differs according to the capability of the imaging apparatus, for example, a case can be conceived where a value approximate to the upper limit of a motion such that the shift of the focus is inconspicuous even when adjusting the focus for contrast detection to perform imaging, is taken as the threshold. Also, a case can also be conceived where a value such that deterioration in image quality when switching from the contrast thinning-out mode to the phase difference thinning-out mode is inconspicuous due to image blurring or the like according to a motion of a subject, is taken as the threshold.

Feature Example of Readout Mode

FIGS. 10A and 10B are schematic diagrams indicating the features of each mode of the readout modes that the readout mode determining unit 270 according to the first embodiment of the present technology sets.

FIG. 10A indicates a table (table 470) indicating the features of each of the four types of readout modes of the imaging device 220 illustrated in FIGS. 5A through 8B. With this table 470, performance of phase difference detection (column 472), performance of contrast detection (column 473), readout speed (column 474), image quality (column 475), and imaged image use (column 476) are indicated for each readout mode (column 471).

As indicated in Table 470, with the all-pixel readout mode, both of phase difference detection and contrast detection are available, but a still image is being imaged, and accordingly, contrast detection is not performed to ease the processing, and focus determination is performed with phase difference detection alone. The focusing lens is then driven based on focus determination according to phase difference detection, and focus processing for the next imaging (still image if continuous shooting, live view image if single shooting) is performed. Note that, with this all-pixel readout mode, a signal is read out from all of the pixels, and accordingly, readout speed is the slowest ("×1" is indicated in FIG. 10B). However, image quality for reading out a signal from all of the pixels is the best, and the all-pixel readout mode is set when obtaining a still image.

Also, with the contrast thinning-out mode, phase difference detection is not executable, and contrast detection alone is executable. Therefore, in the event that the contrast thinning-out mode has been set, focus determination is performed with contrast detection alone. Note that, with the contrast thinning-out mode, the number of rows (lines) to be read out is 1/3 in the all-pixel readout mode, and accordingly, readout speed becomes triple (×3). Also, the number of rows is 1/3 in the all-pixel readout mode, and accordingly, image quality is slightly worse (better than the phase difference thinning-out mode, worse than the moving image thinning-out mode). An image imaged in the contrast thinning-out mode is used as a high-quality live view image.

With the phase difference thinning-out mode, though both of phase difference detection and contrast detection are available, this mode is a mode wherein the in-plane MV summation is set higher (the motion of a subject is greater) than a threshold, and accordingly, focus determination is performed giving preference to phase difference detection. Note that contrast detection is also available, and accordingly, contrast detection is used together with phase difference detection so as to perform focus determination even in the event that phase difference detection is difficult (e.g., in the event that a subject is dark) or the like. Also, with the phase difference thinning-out mode, the number of rows to be read out is 1/3 in the all-pixel readout mode, and accordingly, readout speed becomes triple (×3). Note that, with the phase difference thinning-out mode, though the number of rows to be read out is the same as with the contrast thinning-out mode, with the contrast thinning-out mode, signals read out are all the signals of the image generating pixels, while on the other hand, with the phase difference thinning-out mode, the signals of the phase difference detecting pixels are also read out. That is to say, with the phase difference thinning-out mode, interpolation is frequently performed, and image quality is worse than image quality in the contrast thinning-out mode ("worst" is displayed in FIG. 10A). An image imaged in the phase difference thinning-out mode is used as a low-quality live view image.

With the moving image thinning-out mode, phase difference detection is not executable, and contrast detection alone is executable, and accordingly, focus determination is performed with contrast detection alone. Note that, with the moving image thinning-out mode, after one row is thinned out, signals are added between pixels in two rows and read out (see FIGS. 8A and 8B), and accordingly, readout speed becomes triple (×3). Also, image quality in the moving image thinning-out mode is worse than image quality in the all-pixel readout mode, and is better than image quality in the contrast thinning-out mode ("slightly better" is displayed in FIG. 10A), and an image imaged in the moving image thinning-out mode is used as an image of a moving image.

In FIG. 10B, focusing attention on the readout mode at the time of focus determination when imaging of a still image, a table indicating a relation between a motion of a subject (in-plane MV summation) to be used for determining the readout mode at the time of focus determination, and the readout mode (table 480) is indicated. With this table 480, the readout mode to be set (column 482), focus determining method (column 483), and speed of focusing (column 484) are indicated for each motion of a subject (column 481).

As indicated in Table 480, in the event that the motion of a subject is none or small, the contrast thinning-out mode is set as the readout mode. On the other hand, in the event that the motion of a subject is great, the phase difference thinning-out mode is set as the readout mode. That is to say, when the motion of a subject is none or small, contrast detection is performed, and focus speed (AF speed) is slow. On the other hand, when the motion of a subject is great, phase difference detection is preferentially executed, and focus speed is fast.

In this way, when the motion of a subject is small, the contrast thinning-out mode is set, and though AF speed is slow, image quality is good. When the motion of a subject is small, even when the focus is adjusted using contrast detection to be performed in the contrast thinning-out mode, which is enough in time. Also, when the motion of a subject is small, the user can readily confirm details, but at this time, a suitable-quality live view image can be displayed. That is to say, the image quality of a live view image at the time of focus adjustment can be improved.

When the motion of a subject is great, the phase difference thinning-out mode is set, and though AF speed is fast, image quality is worse. When the motion of a subject is great, contrast detection is not in time, and accordingly, phase difference detection that is executable in the phase difference thinning-out mode is suitable. Also, when the motion of a subject is great, a subject image in a live view image flows or becomes blurred, and accordingly, the user is not able to confirm details. Therefore, even though image quality is worse, coarseness of a live view image is inconspicuous for the user. That is to say, focusing control can be performed by phase difference detection at timing with coarseness of image quality being inconspicuous, and focusing control suitable for a subject can be performed without sacrificing the image quality of a live view image.

In this way, the readout mode at the time of focus adjustment can be set according to a motion of a subject, and accordingly, balance between focus speed (AF speed) and image quality can automatically be adjusted. That is to say, focusing control suitable for a subject is performed, and also the image quality of a live view image at the time of focus adjustment can be improved.

Operation Example of Imaging Apparatus

Next, the operation of the imaging apparatus 100 according to the first embodiment of the present technology will be described with reference to the drawings.

Figure 11:
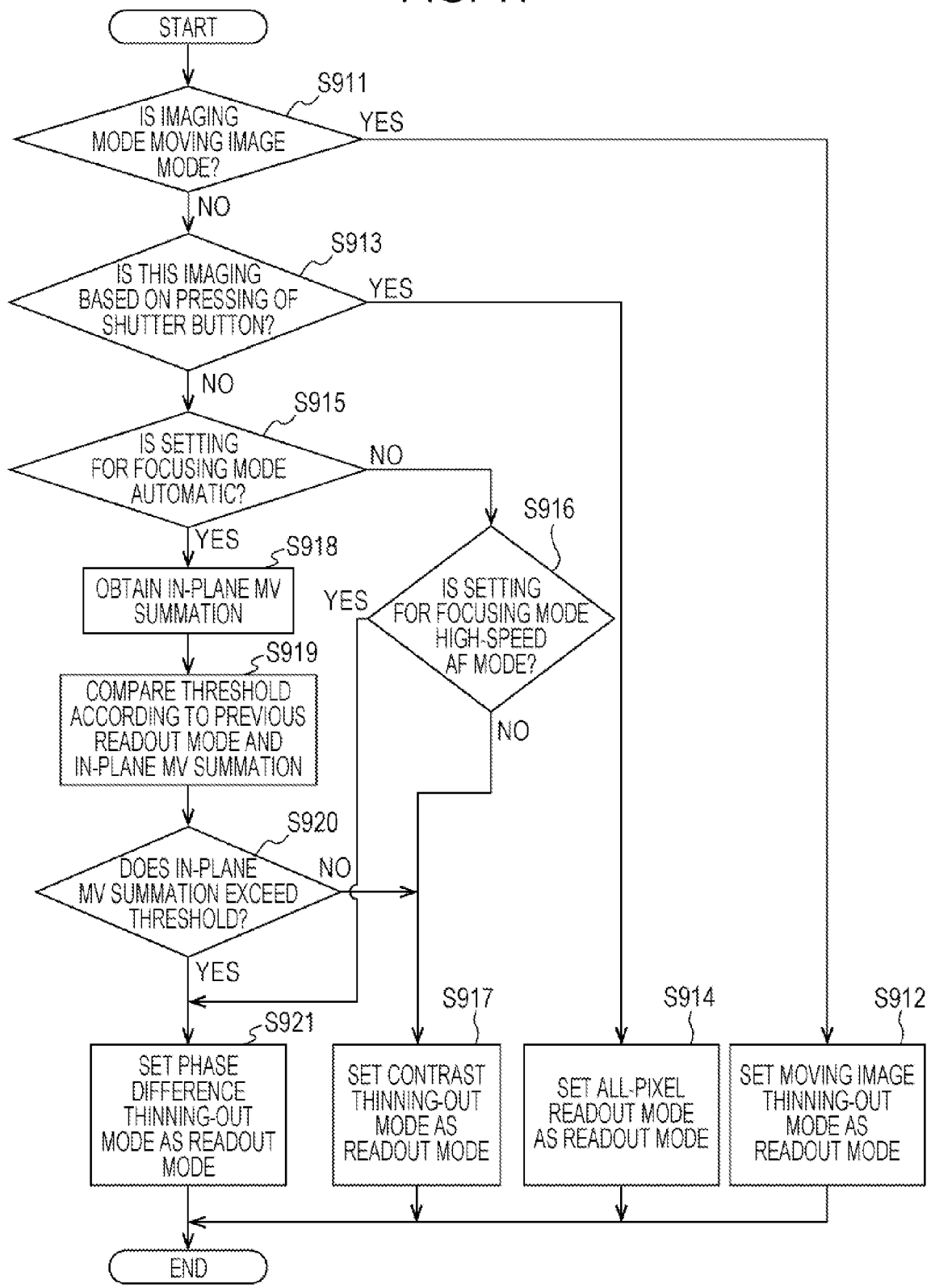
FIG. 11 is a flowchart illustrating an example of a readout mode determination processing procedure of an imaging apparatus according to the first embodiment of the present technology.

FIG. 11 is a flowchart illustrating an example of a readout mode determining processing procedure of the imaging apparatus 100 according to the first embodiment of the present technology.

Note that, it is assumed that the readout mode determining processing procedure illustrated in FIG. 11 is executed each time imaging employing the imaging device 220 is performed. That is to say, in a state in which focus adjustment is performed while displaying a live view image of imaging of a still image, the readout mode determining processing procedure is performed (for each frame) each time an image to be used for display of a live view image or focus adjustment is obtained.

First, before the imaging device 220 performs imaging, whether or not the moving image mode has been set as the imaging mode is determined by the readout mode determining unit 270 based on information from the control unit 299 (step S911). In the event that determination is made that the moving image mode has been set (Yes in step S911), the moving image readout mode has been set as the readout mode of the imaging device 220 (step S912), and the readout mode determining processing procedure is ended.

On the other hand, in the event that determination is made that the moving image has not been set (No in step S911), determination is made by the readout mode determining unit 270 whether or not an image to be obtained by the next imaging is imaging based on pressing of the shutter button (step S913). Thus, in the event that the imaging mode (the moving image mode has not been set) for imaging of a still image has been set, determination is made whether or not an image to be imaged is an image for saving a still image. In the event that determination is made that the image to be obtained by the next imaging is imaging based on pressing of the shutter button (imaging for saving a still image) (Yes in step S913), the all-pixel readout mode has been set as the readout mode of the imaging device 220 (step S914), and the readout mode determining processing procedure is ended.

Also, in the event that determination is made that the image to be obtained by the next imaging is not imaging based on pressing of the shutter button (No in step S913), whether or not the mode of focus adjustment is an auto (automatic) mode is determined by the readout mode determining unit 270 (step S915). That is to say, in the event that determination is made that the image to be obtained by the next imaging is imaging for live view and focus adjustment, the mode of focus adjustment is determined. In the event that determination is made that the mode (focusing mode) of focus adjustment is not the auto mode (specified by the user) (No in step S915), determination is made whether or not the high-speed AF mode has been set as the focusing mode (step S916). In the event that determination is made by the readout mode determining unit 270 that the high-speed AF mode has been set as the focusing mode (Yes in step S916), the flow proceeds to step S921.

On the other hand, in the event that determination is made that the high-speed AF mode has not been set as the focusing mode (high-quality (low-speed AF) mode has been set) (No in step S916), the contrast thinning-out mode is set as the readout mode of the imaging device 220 (step S917). After step S917, the readout mode determining processing procedure is ended.

Also, in the event that determination is made that the focusing mode is the auto mode (Yes in step S915), the motion vector of (in-plane MV summation) of the image of the last frame is detected by the motion vector detecting unit 260, and this detected in-plane MV summation is obtained by the readout mode determining unit 270 (step S918). Next, comparison between the threshold according to the readout mode set at the time of obtaining the image of the last frame and the obtained in-plane MV summation is performed by the readout mode determining unit 270 (step S919). That is to say, in step S919, as illustrated in FIG. 9, the threshold (first threshold 461 or second threshold 462) is set so as to apply hysteresis to determination of the readout mode, and comparison with the in-plane MV summation is performed. Next, whether or not the in-plane MV summation is greater with the threshold as a reference is determined by the readout mode determining unit 270 (step S920). In the event that determination is made that the in-plane MV summation is smaller than the threshold (motion is smaller) (No in step S920), the flow proceeds to step S917. Note that step S918 is an example of a detection procedure. Also, step S920 is an example of a determination procedure.

On the other hand, in the event that determination is made that the in-plane MV summation is greater (motion is greater)

than the threshold (Yes in step S920), the phase difference thinning-out mode is set as the readout mode of the imaging device 220 (step S921), and the readout mode determining procedure is ended.

In this way, according to the first embodiment of the present technology, the readout mode at the time of focus adjustment is set according to a motion of a subject, whereby a signal can be read out from the imaging device using a thinning-out method suitable for the subject. Also, in the event that an imaging operation (moving image imaging or still image imaging) has been specified, a signal can be read out from the imaging device with a suitable thinning-out method according to the specification thereof. That is to say, according to the first embodiment of the present technology, thinning-out processing at the time of reading out a signal from the imaging device can suitably be set.

2. Second Embodiment

With the first embodiment of the present technology, description has been made regarding an example wherein the readout mode at the time of focus adjustment in imaging of a still image is switched between the contrast thinning-out mode and the phase difference thinning-out mode based on in-plane MV summation (a value that the in-plane MV summation information indicates). Note that, in the contrast thinning-out mode, a signal from a phase difference detecting pixel is not read out, and accordingly, in the contrast thinning-out mode, focus determination is performed by contrast detection, and in the phase difference thinning-out mode, focus determination by phase difference detection is preferentially performed. Note that the readout mode switching method is not restricted to this, and for example, a case can also be conceived where there are provided three or more readout modes to be switched based on in-plane MV summation. Also, a case or the like can also be conceived where after determining the readout mode based on in-plane MV summation, a focus determining method is further switched based on in-plane MV summation.

Therefore, with the second embodiment of the present technology, description will be made regarding an example wherein after the readout mode is determined based on in-plane MV summation, a focus determining method is further switched based on in-plane MV summation, with reference to FIG. 12.

Figure 12A:
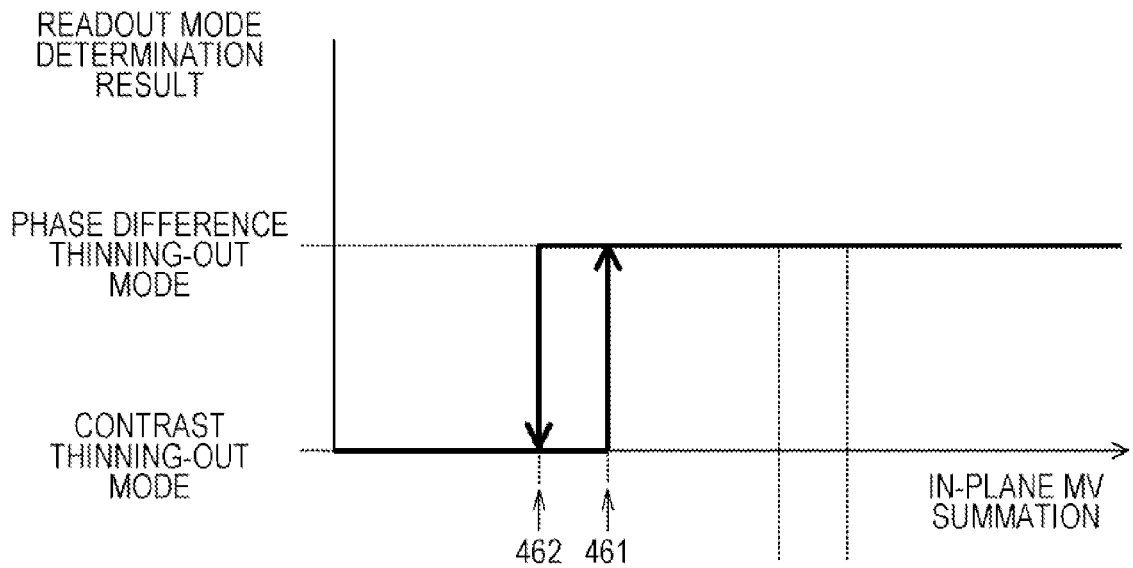
FIGS. 12A and 12B are schematic diagrams illustrating a relation between in-plane MV summation that a motion vector detecting unit according to a second embodiment of the present technology calculates and a readout mode at the time of focus adjustment that the readout mode determining unit determines.
Figure 12B:
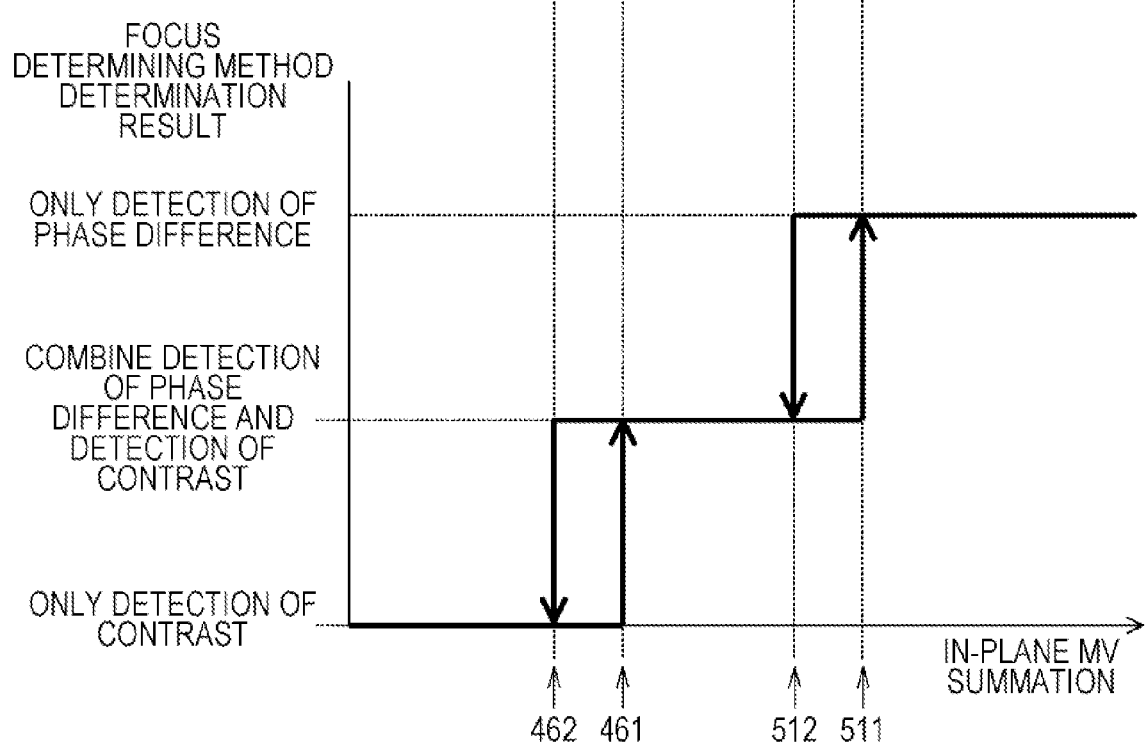

Relation Example between In-Plane MV Summation Value, Readout Mode and Focus Determining Method FIGS. 12A and 12B are schematic diagrams illustrating a relation between in-plane MV summation that a motion vector detecting unit 260 according to the second embodiment of the present technology calculates, and the readout mode at the time of focus adjustment determined by the readout mode determining unit 270.

FIG. 12A illustrates a graph illustrating a relation between the readout mode (contrast thinning-out mode or phase difference thinning-out mode) at the time of focus adjustment when imaging a still image and in-plane MV summation (a value that in-plane MV summation information indicates), in the same way as with FIG. 9. Note that FIG. 12A is the same as with the graph in FIG. 9 except that the scales of the horizontal and vertical axes differ from those in FIG. 9, and accordingly, description will be omitted here.

FIG. 12B illustrates a graph illustrating a relation between in-plane MV summation and a focus determining method with the horizontal axis as an axis indicating in-plane MV summation, and with the vertical axis as a determination result of a focus determining method at the time of focus adjustment.

As illustrated in this graph, the first threshold 461 serves as a reference of determination for switching the focus determining method from contrast detection alone to detection according to a combination between phase difference detection and contrast detection (combined detection). Also, the second threshold 462 serves as a reference of determination for switching from combined detection and phase difference detection alone to contrast detection alone. Also, this graph indicates a threshold (third threshold 511) serving as a reference of determination for switching the focus determining method from contrast detection alone and combined detection to phase difference detection alone. Also, this graph indicates a threshold (fourth threshold 512) serving as a reference of determination for switching from phase difference detection alone to combined detection. Note that the first threshold and second threshold indicated in the graph in FIG. 12B have the same values as the first threshold 461 and second threshold 462 indicated in FIG. 12A, and accordingly, the first threshold and second threshold 462 are denoted with the same reference numerals. Also, applying hysteresis to the focus determining method is the same as applying hysteresis to determination of the readout mode, and accordingly, detailed description will be omitted.

Now, combined detection will be described. With combined detection, focusing control is performed using both of phase difference detection whereby the focusing lens can rapidly be driven to a focus position, and contrast detection whereby a time-consuming but accurate focus position can be detected. For example, first, a focus position is detected by phase difference detection, and the focusing lens is driven aiming at a position passing through the detected focus position in a sure manner. At this time, multiple images are imaged from around in front of the focus position detected by phase difference detection to a position passed therethrough, and contrast detection is performed using the imaged images. The focusing lens is driven to the focus position detected by contrast detection, and is finally focused (e.g., see Japanese Unexamined Patent Application Publication No. 2009-69255).

Specifically, with combined detection, as compare to a case where focusing control is performed by contrast detection alone, obtaining of multiple images having a different focus position to be detected by contrast detection is reduced (a period for performing mountaineering detection is shortened), and accordingly, the focusing lens can be focused in less time.

As illustrated in FIG. 12B, with the second embodiment of the present technology, in the event that in-plane MV summation is somewhat great (greater than the first threshold 461), the readout mode is switched from the contrast thinning-out mode to the phase difference thinning-out mode, and also, the focus determining method is switched from contrast detection alone to combined detection. Also, in the event that in-plane MV summation is significantly great (greater than the third threshold 511), the state becomes a state in which the thinning-out mode is the phase difference thinning-out mode, and the focus determining method is phase difference detection alone. That is to say, with the second embodiment of the present technology, not only the readout mode but also the focus determining method are switched according to the size of a motion of a subject.

In this way, according to the second embodiment of the present technology, the readout mode at the time of focus adjustment can be set according to a motion of a subject, and also the focus determining method can be set according to a motion of a subject.

In this way, according to an embodiment of the present technology, thinning-out processing at the time of reading out a signal from the imaging device can suitably be set.

Also, according to an embodiment of the present technology, the readout mode at the time of focus adjustment can be set according to a motion of a subject, and accordingly, balance between focus speed (AF speed) and image quality can automatically be adjusted.

Note that, according an embodiment of the present technology, with all of the thinning-out modes (phase difference detection thinning-out mode, contrast detection thinning-out mode, and moving image thinning-out mode), the number of lines to be read out becomes 1/3as compared to all pixel readout. That is to say, the number of lines to be read out does not increase nor decrease, and accordingly, processing contents at the RAW correction processing unit 230 and camera signal processing unit 235 do not have to be changed greatly. Thus, load in image processing can be eased.

Also, with the embodiment of the present technology, though description has been made assuming 1/3thinning out, the thinning-out method is not restricted to this, the interval of thinning out has to be set according to pixel arrangement in the imaging device. Also, with the embodiment of the present technology, though an example has been described wherein the readout mode is switched according to in-plane MV summation, the switching method is not restricted to this, and for example, a case or the like can also be conceived where the readout mode is switched according to a motion of an object to be focused (an object within a focus area).

Note that, with the embodiment of the present technology, though description has been made assuming that a color filter to be provided to the image generating pixels is a three-primary-color (RGB) filter, the color filter is not restricted to this. For example, in the event that a complementary-color filter is provided to the image generating pixels as well, the embodiment of the present technology can be applied in the same way. Also, even in a case where a pixel for detecting all of wavelength rays of a visible light area using one pixel area (e.g., imaging device in which a pixel for blue color, a pixel for green color, and a pixel for red color are disposed in the optical axis direction in an overlapped manner) is an image generating pixel as well, the embodiment of the present technology can be applied in the same way.

Also, with the embodiment of the present technology, though description has been made assuming that the phase difference detecting pixels receive one of two pupil-divided rays, but the light receiving method is not restricted to this. For example, even in the event of a phase difference detecting pixel which includes two light-receiving elements instead of a light-shielding layer for pupil division, and can receive pupil-divided rays at the light-receiving elements respectively, the embodiment of the present technology can be applied. Also, even in the event of a phase difference detecting pixel which has a half-sized light-receiving element instead of a light-shielding layer for pupil division, and can receive one of pupil-divided lays at the half-sized light-receiving element, thinning-out processing can suitably be performed in the same way.

Also, though as for the color filters of the phase difference detecting pixels, description has been made assuming W filters, the color filters are not restricted to this, and there can be conceived a case where a transparent layer is provided instead of the filters, a case where G filters are provided instead of the W filters, or the like. Also, though an example has been described wherein a phase difference detecting pixel is disposed in the position of a G pixel, the position of a phase difference detecting pixel is not restrict to this, and a case can be conceived where a part of the R pixels and B pixels are taken as phase difference detecting pixels.

Note that the above-mentioned embodiments are an example for realizing the present technology, features in the embodiments have correspondence relations with features in the Claims, respectively. Similarly, features in the Claims and features in the embodiments of the present technology denoted with the same names as these have correspondence relations, respectively. However, the present technology is not restricted to the embodiments; rather various modifications of the embodiments may be bade without departing from the essence thereof to carry out the present technology.

Also, the processing procedures described in the above-mentioned embodiment may be regarded as a method including these series of procedures, or may be regarded as a program causing a computer to execute these series of procedures, through a recording medium in which the program thereof is stored. Examples to be used as this recording medium include a hard disk, CD (Compact Disc), MD (Mini-Disc), DVD (Digital Versatile Disk), memory card, and Blu-ray Disc (registered trademark).

Note that the present technology may have the following configurations.

(1) An information processing device including: a detecting unit configured to detect a motion of a subject included in an image generated by an imaging device including a plurality of phase difference detecting pixels which generate a signal arranged to perform focus determination by phase difference detection, and a plurality of image generating pixels which generate a signal arranged to generate an image; and a determining unit configured to determine thinning-out processing when reading out a signal from the imaging device, according to the detected motion of a subject.

(2) The information processing device according to (1), wherein the thinning-out processing includes first processing arranged to generate an image using a signal read out from a line including the phase difference detecting pixels, and second processing arranged to generate an image using a signal read out from only a line not including the phase difference detecting pixels; and wherein the determining unit determines, when the motion of a subject detected by the detecting unit during focus determination is great with a threshold as a reference, the first processing as the thinning-out processing, and when the motion of a subject is small with a threshold as a reference, determines the second processing as the thinning-out processing.

(3) The information processing device according to (2), further including: a focusing control unit configured to perform, when the first processing is determined, focusing control based on focus determination by the phase difference detection, and to perform, when the second processing is determined, focusing control based on focus determination by contrast detection.

(4) The information processing device according to (2) or (3), wherein an interval between lines to be read out in the first processing, and an interval between lines to be read out in the second processing are the same.

(5) The information processing device according to any of (1) through (4), wherein the determining unit determines, when an imaging operation of a moving image is performed, third processing arranged to generate an image using a signal read out from only a line not including the phase difference detecting pixels regardless of the detected motion of a subject.

(6) The information processing device according to (5), wherein the thinning-out processing includes first processing arranged to generate an image using a signal read out from a line including the phase difference detecting pixels, and second processing arranged to generate an image using a signal read out from only a line not including the phase difference detecting pixels; and wherein the third processing is thinning-out processing arranged to add, with a line not including the phase difference detecting pixels, a signal from a pixel having the same wavelength of subject light to be detected before readout to equalize the number of lines to be read out in the third processing and the number of lines to be read out in the first processing.

(7) The information processing device according to any of (1) through (6), further including: an operation accepting unit configured to accept a focusing mode specification operation; wherein the determining unit determines the thinning-out processing based on the accepted specification operation regardless of the detected motion of a subject.

(8) The information processing device according to (7), wherein the thinning-out processing includes first processing arranged to generate an image using a signal read out from a line including the phase difference detecting pixels, and second processing arranged to generate an image using a signal read out from only a line not including the phase difference detecting pixels; and wherein the determining unit determines, when a focusing mode for high-speed focusing is specified, the first processing as the thinning-out processing, and when a focusing mode for giving preference to image quality over high-speed focusing is specified, determines the second processing as the thinning-out processing.

(9) The information processing device according to (1), wherein the thinning-out processing includes fourth processing that is predetermined thinning-out processing, and fifth processing that is lower than the fourth processing in a signal percentage of the phase difference detecting pixels of signals to be read out; and wherein the determining unit determines, when the motion of a subject detected by the detecting unit during focus determination is great with a threshold as a reference, the fourth processing as the thinning-out processing, and when the motion of a subject is small with a threshold as a reference, determines the fifth processing as the thinning-out processing.

(10) An information processing method including: a detecting procedure arranged to detect a motion of a subject included in an image generated by an imaging device including a plurality of phase difference detecting pixels which generate a signal arranged to perform focus determination by phase difference detection, and a plurality of image generating pixels which generate a signal arranged to generate an image; and a determining procedure arranged to determine thinning-out processing when reading out a signal from the imaging device, according to the detected motion of a subject.

(11) A program causing a computer to execute: a detecting procedure arranged to detect a motion of a subject included in an image generated by an imaging device including a plurality of phase difference detecting pixels which generate a signal arranged to perform focus determination by phase difference detection, and a plurality of image generating pixels which generate a signal arranged to generate an image; and a determining procedure arranged to determine thinning-out processing when reading out a signal from the imaging device, according to the detected motion of a subject.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
an image processing circuit configured to:
control detection of motion of a subject included in an image generated by an imaging device, wherein the imaging device includes a plurality of phase difference detecting pixels which generate a signal to perform focus determination by phase difference detection, and a plurality of image generating pixels which generate a signal to generate an image; and
determine a thinning-out processing when reading out a signal from the imaging device, according to the detected motion of the subject in an event of imaging a still image, wherein the thinning-out processing is determined to be a moving image thinning-out mode, in an event of imaging a moving image, to generate an image using a signal read out from one or more lines not including the plurality of phase difference detecting pixels regardless of the detected motion of the subject.

2. The information processing device according to claim 1, wherein the image processing circuit is configured to perform the thinning-out processing further including a phase difference thinning-out mode to generate the image using a signal read out from one or more lines of the imaging device including the plurality of phase difference detecting pixels, and a contrast thinning-out mode to generate the image using the signal read out from the line of the imaging device not including the plurality of phase difference detecting pixels; and
wherein the image processing circuit is configured to determine:
the phase difference thinning-out mode as the thinning-out processing when the motion of the detected subject is greater than a threshold, and
the contrast thinning-out mode as the thinning-out processing when the motion of the detected subject is smaller than the threshold.

3. The information processing device according to claim 2, wherein the image processing circuit is configured to:
perform focusing control based on the focus determination by the phase difference detection when the phase difference thinning-out mode is determined to be performed, and
perform focusing control based on the focus determination by contrast detection when the contrast thinning-out mode is determined to be performed.

4. The information processing device according to claim 2, wherein an interval between the one or more lines to be read out in the phase-difference thinning-out mode, and an interval between one or more lines to be read out in the contrast thinning-out mode are the same.

5. The information processing device according to claim 1, wherein the image processing circuit is configured to perform the thinning-out processing including:
a phase difference thinning-out mode to generate the image using a signal read out from one or more lines including the plurality of phase difference detecting pixels, and
a contrast thinning-out mode to generate the image using the signal read out from the line not including the plurality of phase difference detecting pixels; and
wherein the moving image thinning-out mode is thinning-out processing to add, with the line not including the plurality of phase difference detecting pixels, a signal from a pixel having the same wavelength of subject light to be detected before readout to equalize a number of lines to be read out in the moving image thinning-out mode and a number of lines to be read out in the phase difference thinning-out mode.

6. The information processing device according to claim 1, wherein the image processing circuit is configured to:
accept a focusing mode specification operation;
determine the thinning-out processing based on the accepted focusing mode specification operation regardless of the detected motion of the subject.

7. The information processing device according to claim 6, wherein the image processing circuit is configured to perform the thinning-out processing to include:
a phase difference thinning-out mode to generate the image using a signal read out from one or more lines including the plurality of phase difference detecting pixels, and
a contrast thinning-out mode to generate the image using the signal read out from the line not including the plurality of phase difference detecting pixels; and
wherein the image processing circuit is configured to determine, when a focusing mode for high-speed focusing is specified, the phase difference thinning-out mode as the thinning-out processing, and
when a focusing mode for giving preference to image quality over high-speed focusing is specified, determine the contrast thinning-out mode as the thinning-out processing.

8. The information processing device according to claim 1, wherein the image processing circuit is configured to perform the thinning-out processing to include a contrast thinning-out mode that is lower than a phase difference thinning-out mode in a signal percentage of the plurality of phase difference detecting pixels to be read out; and
wherein the image processing circuit is configured to determine, when the detected motion of the subject detected during focus determination is greater than a threshold, the phase difference thinning-out mode as the thinning-out processing, and when the detected motion of the subject is smaller than a threshold, determine the contrast thinning-out mode as the thinning-out processing.

9. The information processing device according to claim 1, wherein the plurality of phase difference detecting pixels are alternately disposed in a direction orthogonal to a direction of reading out the signal from the imaging device.

10. An information processing method comprising:
controlling detection of motion of a subject included in an image generated by an imaging device, wherein the imaging device includes a plurality of phase difference detecting pixels which generate a signal to perform focus determination by phase difference detection, and a plurality of image generating pixels which generate a signal to generate an image; and
determining thinning-out processing when reading out a signal from the imaging device, according to the detected motion of the subject in an event of imaging a still image, wherein the thinning-out processing is determined to be a moving image thinning-out mode, in an event of imaging a moving image, to generate an image using a signal read out from one or more lines not including the plurality of phase difference detecting pixels regardless of the detected motion of the subject.

11. A non-transitory computer-readable storage medium having stored thereon a set of computer-executable instructions for causing the computer to perform steps comprising:
controlling detection of motion of a subject included in an image generated by an imaging device, wherein the imaging device includes a plurality of phase difference detecting pixels which generate a signal to perform focus determination by phase difference detection, and a plurality of image generating pixels which generate a signal to generate an image; and
determining a thinning-out processing when reading out a signal from the imaging device, according to the detected motion of the subject in an event of imaging a still image, wherein the thinning out processing is determined to be a moving image thinning-out mode, in an event of imaging a moving image, to generate an image using a signal read out from one or more lines not including the plurality of phase difference detecting pixels regardless of the detected motion of the subject.

12. An information processing device comprising:
an image processing circuit configured to:
control detection of motion of a subject included in an image generated by an imaging device, wherein the imaging device includes a plurality of phase difference detecting pixels which generate a signal to perform focus determination by phase difference detection, and a plurality of image generating pixels which generate a signal to generate an image; and
determine a thinning-out processing when reading out a signal from the imaging device according to the detected motion of the subject, wherein the thinning-out processing includes:
a first processing arranged to generate the image using a signal read out from a line including the plurality of phase difference detecting pixels,
a second processing arranged to generate the image using a signal read out from a line not including the plurality of phase difference detecting pixels, and
a third processing arranged to generate an image using a signal read out from one or more lines not including the plurality of phase difference detecting pixels regardless of the detected motion of the subject, in an event of imaging a moving image,
wherein, in an event of imaging a still image, the image processing circuit is configured to:
determine the first processing as the thinning-out processing when the motion of the subject during focus determination is greater than a threshold, and
determine the second processing as the thinning-out processing when the motion of the subject is smaller than the threshold.

* * * * *